US005550756A

United States Patent [19]

Ohmi et al.

[11] Patent Number: 5,550,756
[45] Date of Patent: Aug. 27, 1996

[54] TRANSMITTING DEVICE, RECEIVING DEVICE, SYSTEM, AND METHOD FOR TRANSMITTING IMAGE AT HIGH EFFICIENCY

[75] Inventors: Shinichiro Ohmi, Osaka; Hiroyuki Imai, Takarazuka; Kazuhiro Ando; Takayuki Suematsu, both of Osaka, all of Japan

[73] Assignee: Matsushita Electric Industrial Co., Ltd., Osaka, Japan

[21] Appl. No.: 286,130

[22] Filed: Aug. 4, 1994

[30] Foreign Application Priority Data

Aug. 5, 1993 [JP] Japan ................................. 5-194611

[51] Int. Cl.⁶ .................................................. G06F 17/00
[52] U.S. Cl. ........................................................ 364/514 R
[58] Field of Search .......................... 364/514 R, 715.02; 381/29, 30; 360/8; 358/426; 455/6.1; 370/7, 109; 348/384, 390, 409; 340/825.44, 311.1; 341/166; 327/100; 371/37.1

[56] References Cited

U.S. PATENT DOCUMENTS

| | | | |
|---|---|---|---|
| 3,726,993 | 4/1973 | Lavallee | 348/390 |
| 4,703,350 | 10/1987 | Hinman | 358/133 |
| 4,831,439 | 5/1989 | Fedele et al. | 358/133 |
| 5,007,102 | 4/1991 | Haskell | 358/133 |
| 5,070,503 | 12/1991 | Shikakura | 371/37.1 |
| 5,227,795 | 7/1993 | Yamakido et al. | 341/166 |
| 5,249,174 | 9/1993 | Itoh | 370/7 |
| 5,253,058 | 10/1993 | Gharavi | 358/133 |
| 5,473,279 | 12/1995 | D'Angelo et al. | 327/100 |

OTHER PUBLICATIONS

"Transmission of compressed video over radio links", N. MacDonald, BT Technology, vol. 11, No. 2, Apr. 1993, pp. 182–185.

*Primary Examiner*—Ellis B. Ramirez
*Attorney, Agent, or Firm*—Price, Gess & Ubell

[57] ABSTRACT

A transmitting device encodes an animated image by detecting a difference between one image frame and a reference image frame, then transmits the encoded image to a receiving device by a radio line at high efficiency. The transmitting device comprises an image storing unit for storing the reference image frame, an initialization unit for initializing the image storing unit, a difference encoding unit for detecting and encoding the difference, an encoded data storing unit for storing the encoded difference, a transmitting unit for detecting an error detection code in the encoded difference, and transmitting the encoded difference together with transmission information including the error detection code to the receiving device, a receiving unit for receiving reception information from the receiving device which indicates whether the receiving device finds either OK or NG as a result of error detection check which is based on the error detection code, a reproducing unit for reproducing the encoded difference and storing it as one reference frame into the image unit when the reception information indicates OK, and a controlling unit for controlling the difference encoding unit to encode the next image frame when the reception information indicates NG, while controlling the difference encoding unit to encode the next image frame only after the reproducing unit stores a new reference image frame when the received reception information indicates OK.

39 Claims, 19 Drawing Sheets

I(n): initialization information which initializes
division area n in image storing unit 4
CRC(n): CRC code for division area n in
image storing unit 24

TRANSMITTING DEVICE, RECEIVING DEVICE, SYSTEM, AND METHOD FOR TRANSMITTING IMAGE AT HIGH EFFICIENCY

BACKGROUND OF THE INVENTION (1) Field of the Invention

The present invention relates to a transmitting device, a receiving device, a system including these devices, and a method of transmitting digital data which is processed by animated image compression methods (frame encoding, animated compensation prediction) to a radio circuit at high efficiency.

(2) Description of the Related Art

Recently, various methods have been realized to process digital data of animated images. Generally, the information volume of an image is considerably large, so that it is necessary to compress/reduce the information volume before recording or reducing the image. For example, "ITU advice H. 261 video encoding method for audio visual service" is a method of encoding difference information between frames of an animated image.

In this encoding method or the like, the problem of transmission error is overcome by adding an error correction code to encoded image data. Also, a single frame of compressed data is transmitted at a certain interval so as to prevent the transfer of an error in difference information to succeeding frames.

However, when transmitting data by a radio line, the conventional encoding method has the following problem. Adding an error correction code to image data does not eliminate a burst error derived from a fading which is unique to a radio line. Originally, an error correction code was invented to overcome the problem of random error in a wire communication line.

Also, the addition of an error correction code increases the transmission amount, and this slows down the actual transmission rate.

Further, compared to the data amount taken to send difference information, the data amount taken to send one frame data is considerably large. Therefore, data transmission will be slow down at large. Especially when sending data at a low bit rate, the slow down of data transmission extends the time taken since the transmission starts until the reproduction ends (reproduction delay). Accordingly, scheduled smooth movements of animated images are interfered very badly.

SUMMARY OF THE INVENTION

It is an object of the present invention to provide a high efficiency transmission method which is capable of transmitting digital data of animated images by a radio line whose transmission late is slow.

The above object may be fulfilled by a transmitting device for encoding to compress an animated image including a plurality of image frames by detecting a difference between one image frame to be encoded and a reference image frame, then transmitting data of the encoded image to a receiving device by a radio line at high efficiency, the transmitting device comprising an image storing unit for storing the reference image frame which is referred to detect the difference relating to the image frame to be encoded, an initialization unit for, before a first transmission, initializing the image storing unit by initial data which is identical to initial data held by the receiving device, a difference encoding unit for detecting the difference between the image frame to be encoded and the reference image frame, and encoding to compress the difference, an encoded data storing unit for storing the encoded difference data received from the difference encoding unit, a transmitting unit for detecting an error detection code in the encoded difference data, and transmitting the encoded difference data together with transmission information including the error detection code to the receiving device, a receiving unit for receiving reception information from the receiving device, the reception information including information which indicates whether the receiving device finds either OK or NG as a result of error detection check which is based on the error detection code, a reproducing unit for decoding to reproduce the encoded difference data stored in the encoded data storing unit, then storing it as one reference frame into the image storing unit when the received reception information indicates OK, and a controlling unit for controlling the difference encoding unit to encode to compress the next image frame when the received reception information indicates NG, while controlling the difference encoding unit to encode to compress the next image frame only after the reproducing unit stores a new reference image frame when the received reception information indicates OK.

In this construction, the transmitting device can transmit only encoded difference data as assuring each transmission to the receiving device, without transmitting an encoded image frame unit.

The transmitting unit may divide the encoded difference data into a plurality of radio frames, and transmitting each radio frame and transmission information which includes the error detection code which corresponds to the radio frame to the receiving device; the receiving unit may receive from the receiving device the reception information which corresponds to the transmitted radio frame; and the controlling unit may control the reproducing unit to reproduce the encoded difference data for a single image frame when all the reception information for it indicates OK, while the controlling unit may control the difference encoding unit to encode the difference for a next image frame when at least one of the reception information for a single image frame indicates NG.

Each radio frame may be fixed length, and an excess of encoded data over the data amount of a predetermined number of radio frames may be abandoned.

In this construction, the above effect can be realized by a radio line at a lower speed.

The transmission information may include a transmission frame number which indicates the number of image frames which have been transmitted safely, and the controlling unit may increment the transmission frame number by one upon each updating of the reference image frame in the image storing unit by the reproducing unit, whereby the receiving device can check if its own reference image frame is identical to the reference image frame stored in the transmitting device.

The transmitting device may further comprise an error detection/correction code generating unit for generating an error detection/correction code relating to the reference image frame in the image storing unit, wherein the reception information received by the receiving unit includes the error/correction code relating to the reference image frame stored in the receiving device, and the controlling unit controls the initialization unit to compare the error detection/ correction code included in the reception information received by the receiving unit with the error detection/correction code generated by the error detection/correction code generating unit, and controls the initialization unit to initialize the reference image frame stored in the image storing unit when they do not coincide with each other, as well as controls the transmitting unit to transmit the transmission information which directs to initialize the reference image frame stored in the receiving device.

In this construction, there may a difference between the reference image frame in the transmitting device and a reproduction image in the receiving device, and this difference can be overcome by operating the initialization.

The error detection/correction code generating unit may divide the reference image frame in the image storing unit into a plurality of areas, and generates the error detection/correction code relating to each area; the transmitting unit may divide the encoded difference data into a plurality of radio frames, and transmit the transmission information which includes each radio frame, the error detection code corresponding to the radio frame, and the error detection/correction code corresponding to the area to the receiving device; the receiving unit may receive the reception information from the receiving device which includes a check result according to the error detection code, and information which indicates if the area corresponding to the error detection/correction code is identical to one of areas into which the reference image frame in the receiving device is divided; and the controlling unit may control the transmitting unit to transmit the radio frame which was transmitted at the last transmission together with the error detection/correction code for the next area when the check result included in the reception information indicates an error, also control the initialization unit to initialize all the areas which are not identical to those in the receiving device according to the reception information after the error detection/correction codes for all the areas are transmitted and the reference image frame in the image storing unit is updated.

In this construction, a radio frame unit can be re-transmitted. Also, the above difference can be overcome effectively.

The above object may be fulfilled by a receiving device for receiving encoded difference data at high efficiency from a transmitting device via a radio line, the receiving device comprising an image storing unit including an area where a reproduced image basing upon the encoded difference data is stored, an initialization unit for initializing the image storing unit by initial data which is identical to initial data held by the transmitting device, a receiving unit for receiving the encoded difference data from the transmitting device, and detects an error according to an error detection code included in transmission information which was transmitted together with the encoded difference data, an encoded data storing unit for storing the encoded difference data received by the receiving unit, a reproducing unit for decoding the encoded difference data in the encoded data storing unit when a result of the error detection is OK, reproducing the image frame by adding the decoded data to content of the image storing unit, and storing the reproduced image frame into the image storing unit, a controlling unit for generating reception information which includes the result of the error detection by the receiving unit, and a transmitting unit for transmitting the reception information to the transmitting device.

The receiving unit may receive radio frames into which the encoded difference data is divided, and the controlling unit may control the reproducing unit to reproduce one image frame of the encoded difference data when the error detection result as for all of the radio frames included in it is OK.

The receiving device may further comprise an error detection/correction code generating unit for generating an error detection/correction code relating to a reference image frame stored in the image storing unit, wherein the transmission information includes information which directs whether or not the reference image frame in the image storing unit should be initialized, and the controlling unit generates reception information which includes the generated error detection/correction code, controls the transmitting unit to transmit the reception information, and controls the initialization unit to initialize the reference image frame in the image storing unit when the information included in the transmission information received by the receiving unit directs the initialization.

The transmitting system which fulfills the above object comprises the transmitting device and the receiving device.

The above object may be fulfilled by a high efficiency transmitting method employed in a system which comprises a transmitting device and a receiving device, for encoding to compress an animated image including a plurality of image frames by detecting a difference between one image frame to be encoded and a reference image frame, then transmitting data of the encoded image to a receiving device by a radio line at high efficiency, wherein the transmitting device comprises a first initialization step for, before a first transmission, initializing a first image storing unit by initial data which is identical to initial data held by the receiving device, a first difference encoding step for detecting the difference between the image frame to be encoded and the reference image frame, and encoding to compress the difference, and storing the encoded difference data into a first encoded data storing unit, a first transmitting step for detecting an error detection code in the encoded difference data, and transmitting the encoded difference data together with transmission information including the error detection code to the receiving device, a first receiving step for receiving reception information from the receiving device, the reception information including information which indicates whether the receiving device finds either OK or NG as a result of error detection check which is based on the error detection code, a first reproducing step for encoding to reproduce the encoded difference data stored in the first encoded data storing unit, then storing it as one reference frame into the first image storing unit when the reception information indicates OK, and a first controlling step for controlling the first difference encoding step to encode to compress the next image frame when the reception information indicates NG, while controlling the first difference encoding step to encode to compress the next image frame only after a new reference frame is stored at the first reproducing step when the reception information indicates OK, and the receiving device comprises a second initialization step for initializing a second image storing unit which includes an area where a reproduced image basing upon the encoded difference data is stored by initial data which is identical to initial data held by the transmitting device, a second receiving step for receiving the encoded difference data from the transmitting device and storing it into a second encoded data storing unit, as well as detecting an error according to an error detection code included in transmission information which was transmitted together with the encoded difference data, a second reproducing step for decoding the encoded difference data in the second encoded data storing unit when a result of the error detection at the second receiving step is OK, reproducing the image frame by adding the decoded data to content of the second image storing unit, and storing the reproduced image frame into the second image storing unit, a second controlling step for generating reception information which includes the result of the error detection at the second reproducing step, and a second transmitting step for transmitting the reception information to the transmitting device.

The above effects may be realized by this transmitting method.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings.

DESCRIPTION OF THE PREFERRED EMBODIMENTS

[Embodiment 1]
(overall configuration)

Figure 1:
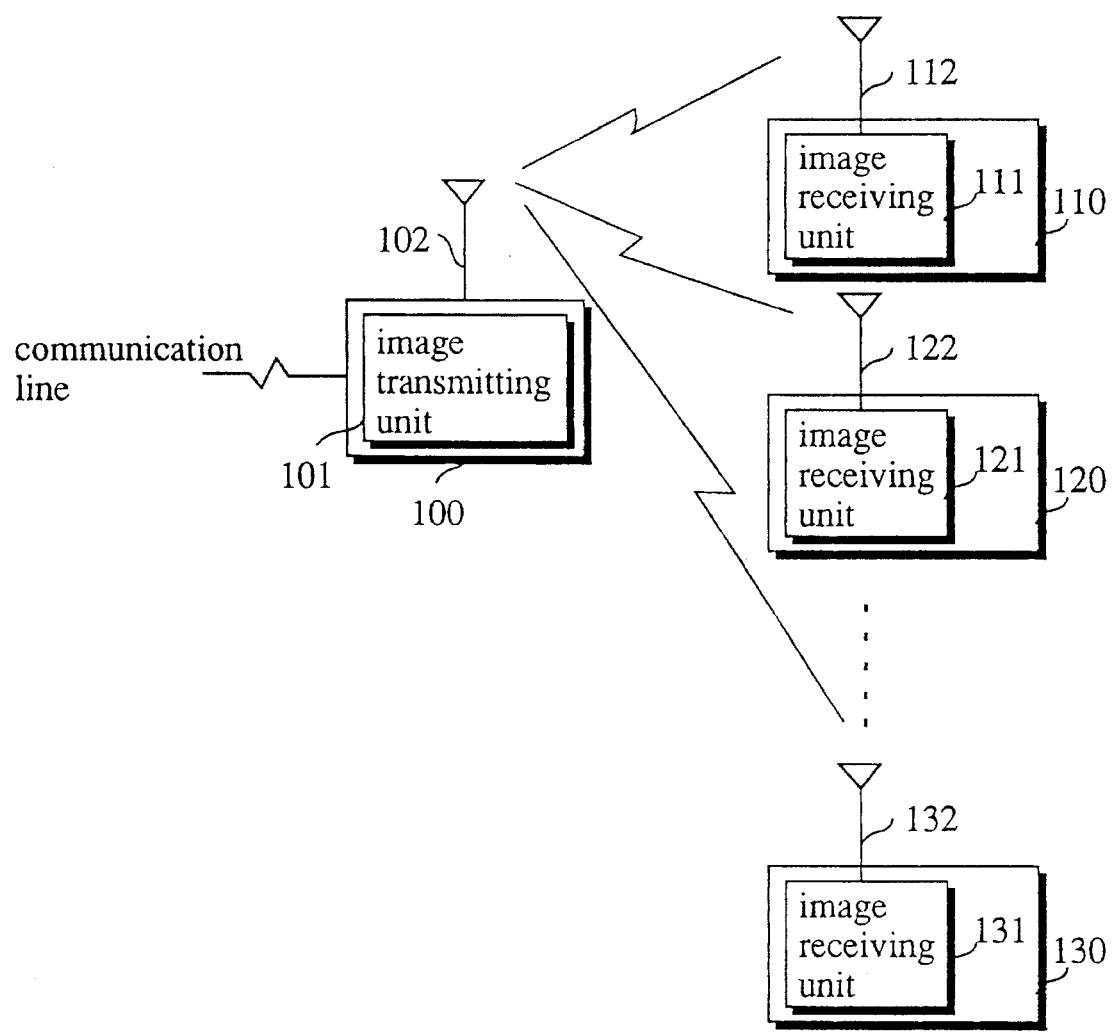
FIG. 1 shows a simple digital cordless telephone system to which a high efficiency image transmission device in a first embodiment of the present invention is applied.

FIG. 1 shows a simple digital cordless telephone system to which a high efficiency image transmission device relating to a first embodiment of the present invention is applied. The simple digital cordless telephone system in FIG. 1 is a so-called PHS (Personal Handy-Phone System) where a master terminal and a subordinate terminal communicate digital data at 32 kbps transmission rate. The high efficiency image transmission device comprises an image transmitting unit and an image receiving unit. In this system example, the image transmitting unit is constructed at a master terminal while the image receiving unit is constructed at a subordinate terminal.

In FIG. 1, a master terminal 100 comprising an image transmitting unit 101 and an antenna 102 functions as one master terminal in the PHS. The image transmitting unit 101 encodes an image signal received by communication line, and transmits it to one of subordinate terminals by the antenna 102.

Subordinate terminals 101, 120, 130 comprising image receiving units 111, 121, 131 and antennas 112, 122, 132 respectively functions as subordinate terminals in the PHS. Each image receiving unit reproduces an image from signals received via the corresponding antenna, then displays it.
(configuration of image transmitting unit)

Figure 2:
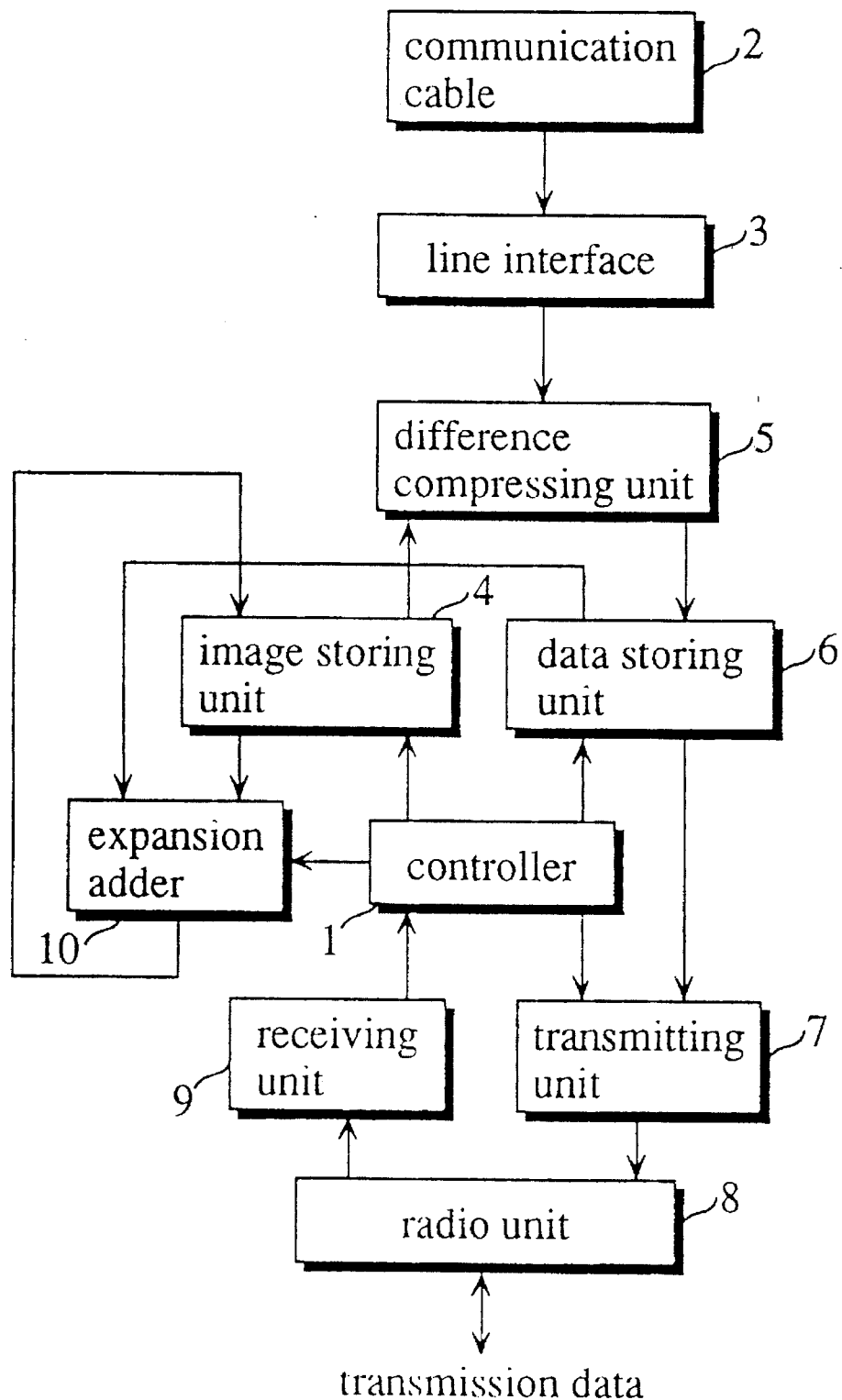
FIG. 2 is a block diagram showing the configuration of an image transmitting unit 101 constructed at a master terminal.
Figure 3:
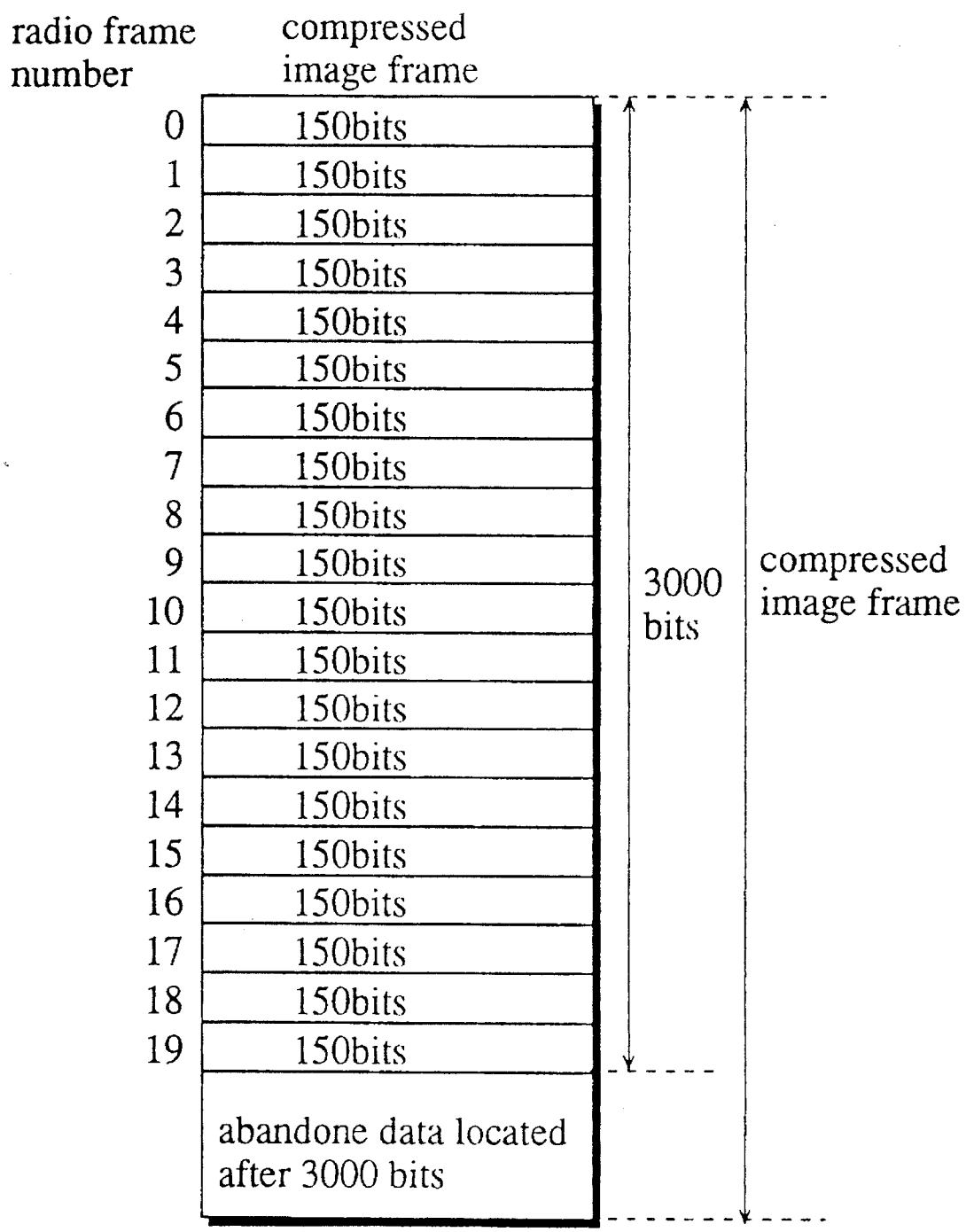
FIG. 3 illustrates how a compressed image frame is divided by a transmitting unit 7.

FIG. 2 shows a block diagram describing the configuration of the image transmitting unit 101 at a master terminal. The image transmitting unit 101 comprises a controller 1, a communication cable 2, a line interface 3, an image storing unit 4, a difference compressing unit 5, a data storing unit 6, a transmitting unit 7, a radio unit 8, a receiving unit 9, and an expansion adder 10. The thus constructed image transmitting unit 101 applies difference encoding to each image frame so as to compress image data, divides a difference encoded image frame into a plurality of radio frames, and transmits each radio frame to a subordinate terminal as assuring every transmission.

The communication cable 2 is connected to a dedicated line or ISDN. An animated image signal or an encoded animated signal is sent to the communication cable 2.

An animated image signal or an encoded animated image signal is inputted from the communication cable 2 to the line interface 3. The line interface 3 then outputs image frames which make up an animated image (normally, 30 image frames per second) one by one. When an encoded animated signal is inputted from the communication cable 2, the line interface 3 decodes it, then outputs image frames one by one. Herein an image frame outputted from the line interface 3 is an intermediate format CIF (Common intermediate Format) or a QCIF (Quater CIF) of H. 261.

The image storing unit 4 stores initial data beforehand, then replaces it with an expanded image frame upon each expansion by the expansion adder 10. Initial data means one image frame of data which is commonly held by the image receiving units 111, 121, 131, and an image frame where every bit value is "0" is held as initial data herein.

The difference compressing unit 5 encodes and compresses an image frame inputted from the line interface 3. To be concrete, the difference compressing unit 5 encodes a difference between a received image frame and an image frame stored in the image storing unit 4 (hereunder called "reference frame"). The variable length encoding method which conforms with CCITT advice H. 261 is employed. The difference compressing unit 5 operates difference encoding on every image frame. Although the above H. 261 also includes encoding of an image frame, the difference compressing unit 5 does not operate this. The data storing unit 6 stores a single image frame of compressed data received from the difference compressing unit 5. A compressed image frame was generated according to the variable length encoding method; therefore, the data amount varies for each image frame.

The transmitting unit 7 divides a compressed image frame stored in the data storing unit 6 into a plurality of radio frames for radio transmission; adds an image number, difference compression data, an error detection code, and a synchronous pattern to each radio frame so as to generate a fixed length data packet; then transmits it. FIG. S shows how a compressed image frame is divided by the transmitting unit 7. In the figure, the first 3000 bits of a compressed image frame are divided into 20 radio frames 0–19. Accordingly, one radio frame has 150 bit data amount. The remaining part of the compressed image frame, that is after the 3000-th bit, is abandoned.

Figure 4:
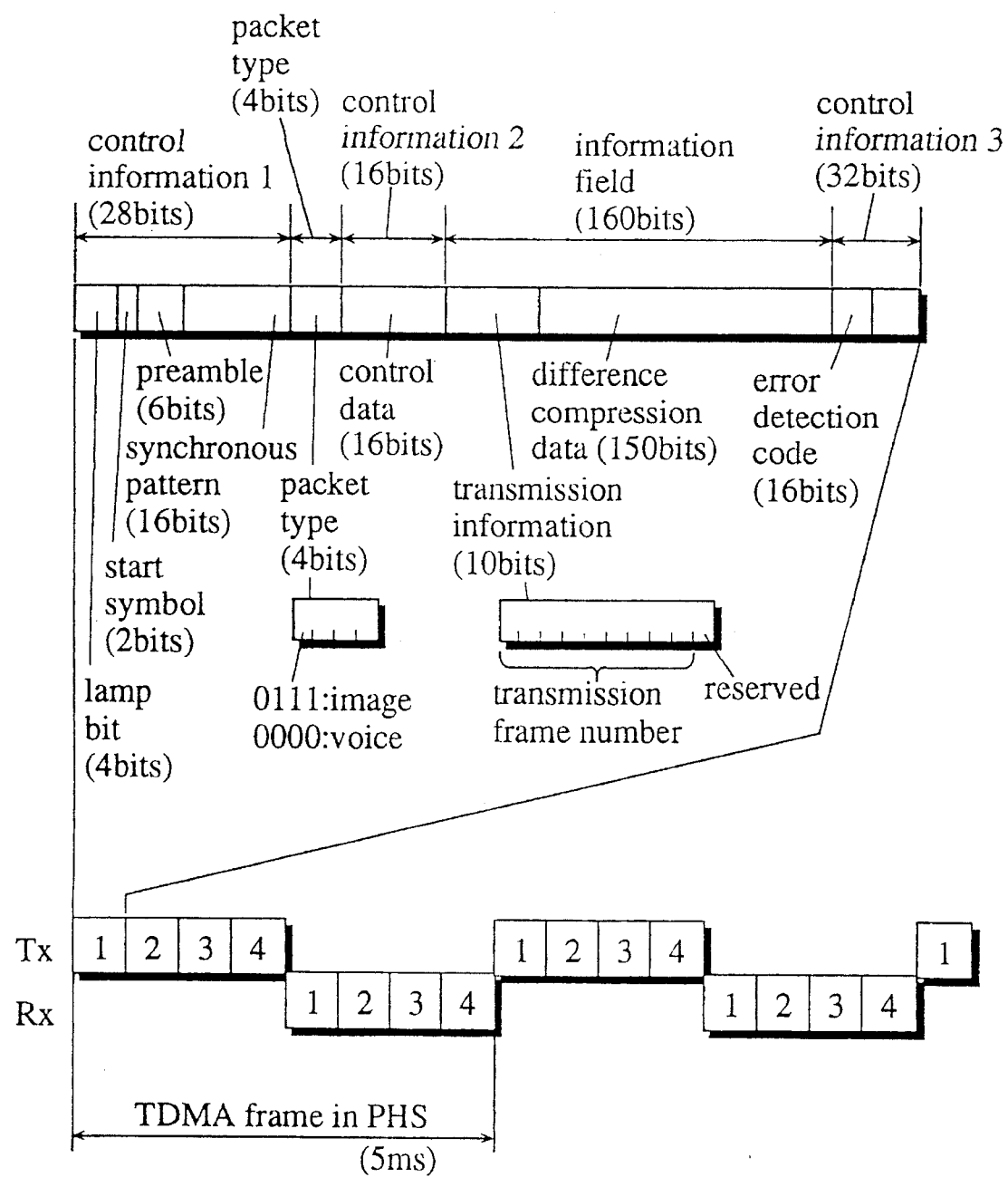
FIG. 4 shows the format of a fixed length data packet generated by the transmitting unit 7.

FIG. 4 shows the format of a fixed length data packet generated by the transmitting unit 7. The data packet in FIG. 4 comprises the cells of control information 1, packet type, control information 2, information field, and control information 3. The control information 1–3 are mainly for TDMA (Time Division Multiple Access) in the PHS, and the further explanation thereof is omitted. The cell of information field includes 10-bit transmission information and 150-bit difference compression data. The first 9 bits of transmission information indicate a transmission frame number and the last one bit of the same is reserved. Difference compression data represents radio frames which correspond to transmission information. The cell of packet type encloses information which indicates whether difference compression data or voice data is set at the information field cell. The cell of error detection code encloses an error detection code with which an error between the packet type cell and the information field cell is detected.

The radio unit 8 modulates a data packet received from the transmitting unit 7, and outputs its radio wave. Also, the radio unit 8 demodulates radio wave received from a subordinate terminal. A data packet outputted by the radio unit 8 is illustrated at the bottom of FIG. 4. The cells 1–4 in FIG. 4 indicate that four subordinate terminals are multiplexed according to TDMA. In FIG. 4, the radio unit 8 transmits a data packet according to a time slot 1 in TDMA time frame.

Figure 5:
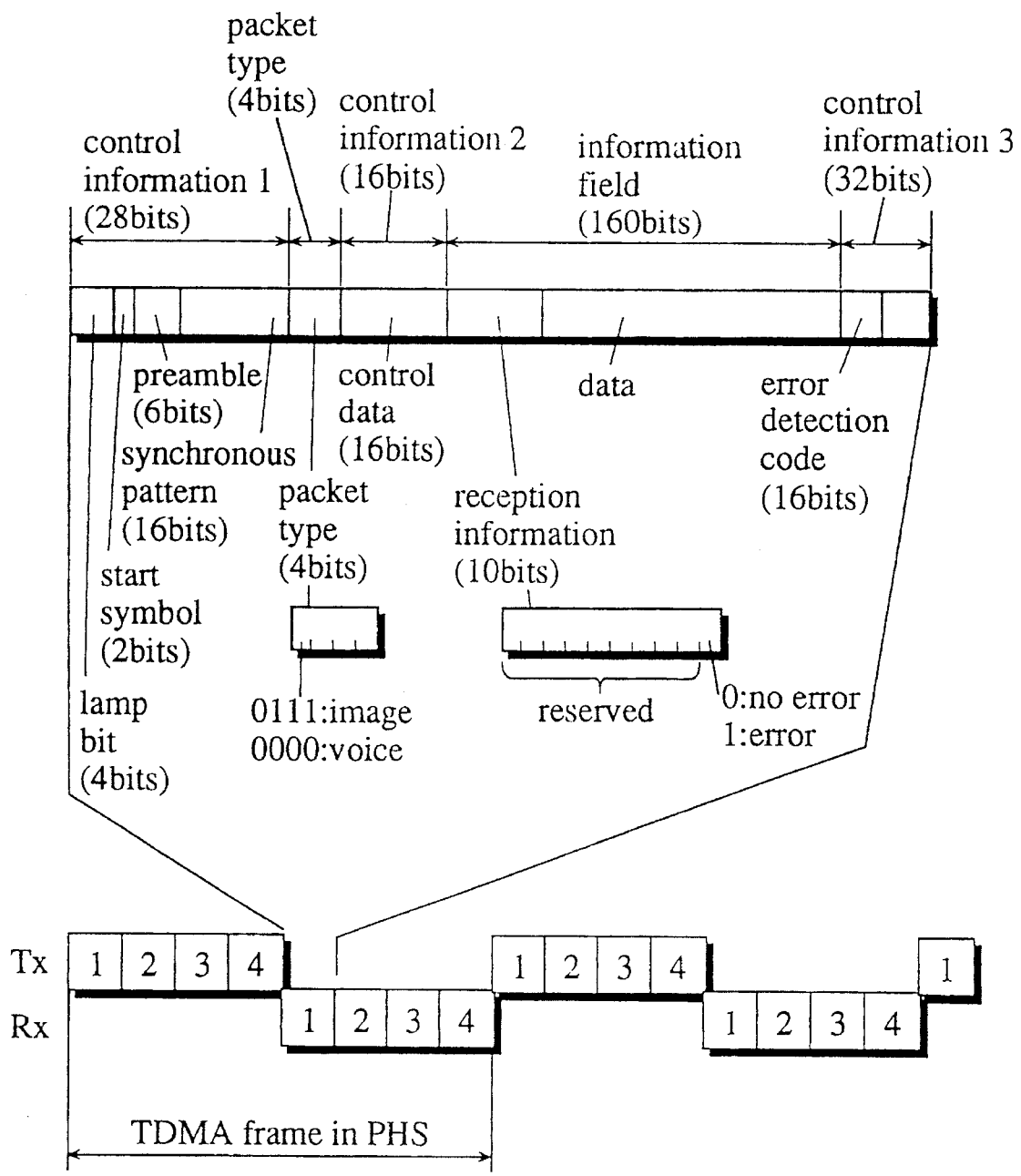
FIG. 5 shows the format of a data packet received by a receiving unit 9.

The receiving unit 9 establishes synchronization according to a synchronous pattern included in a data packet demodulated by the radio unit 8 to receive a data packet; simultaneously, it detects an error by the error detection code included in the data packet. FIG. 5 shows the format of a data packet received by the receiving unit 9. The upper part of FIG. 5 is substantially same as that of FIG. 4 except the content of the information field cell. To the last one bit of the reception information cell, "0" (success) is set when the subordinate terminal receives information safely; whereas "1" (failure) is set when an error occurs so that the subordinate terminal fails to receive information. The first nine bits are reserved. A data packet transmission timing according to the time slot 1 in TDMA time frame is illustrated at the bottom of FIG. 5.

When receiving a expansion request from the controller 1, the expansion adder 10 expands difference compression data in the data storing unit 4, adds the expanded result to reproduction image data stored in the storing unit 4 so as to generate image data. Subsequently, the expansion adder 10 stores the image data into the image storing unit 4 as a newly reproduction image. The thus reproduced image is the same as the one reproduced at the receiving end originally.

The controller 1 controls difference encoding of an image frame, transmission of a data packet which includes radio frames, and reception of a data packet which includes reception information derived from a subordinate terminal. More specifically, the controller 1 comprises a transmission counter (not illustrated) which counts up upon each transmission of a data packet which includes radio frames, a first register (not illustrated) for storing a transmission frame number which indicates how many image frames have been transmitted safely, an error flag which indicates if an error occurs in transmission of a data packet which includes reception information, and a transmission flag which indicates if an error is included in reception information received from a subordinate terminal. The controller sets 20 times as utmost transmission frequency per an image frame, controls to transmit the radio frames in order as examining reception information from a sub-ordinate terminal, then, if 20 radio frame transmissions are carried out for one image frame, it controls to make another 20 transmissions for the next image frame. To the error flag, "0" is set when every transmission is carried out safely, while "1" is set when any transmission error is detected. To the transmission flag, "0" is set when no error is included, while "1" is set when an error is included.

(detailed control by controller 1)

Figure 6:
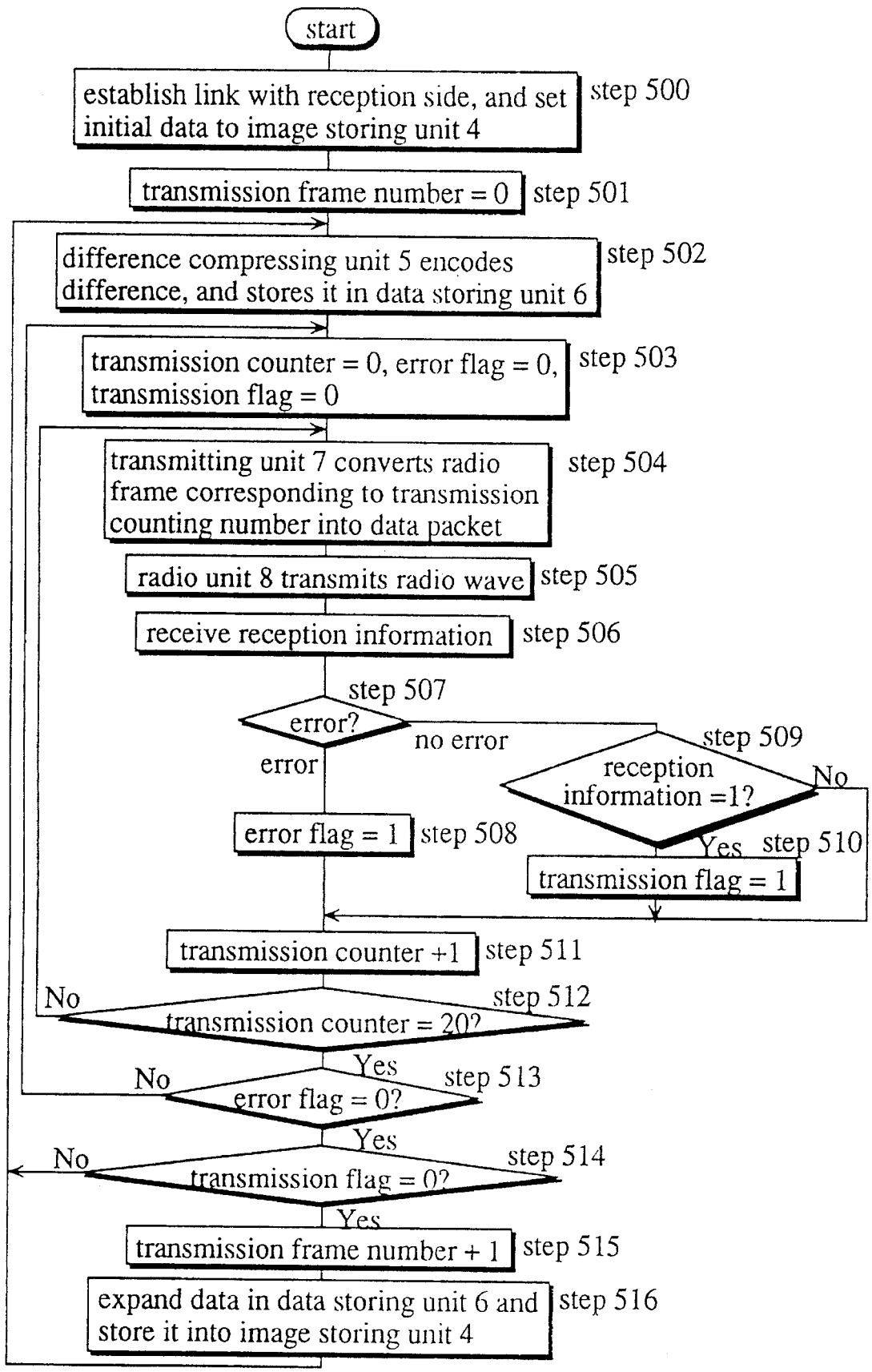
FIG. 6 is a flow chart describing detailed control processing by a controller 1 at the image transmitting unit.

FIG. 6 is a flow chart depicting detailed control processing by the controller 1. When the communication cable 2 starts to encode, the controller 1 establishes a radio link between itself and a subordinate terminal, sets initial data to the image storing unit 4 (Step 500), resets a transmission frame number in the first register to 0 (Step 501). When the line interface 3 writes an encoded image frame into the data storing unit 6 (Step 502), the controller 1 resets all of the transmission counter, error flag, and transmission flag to 0 (Step 503). Subsequently, the controller 1 generates a data packet from a radio frame in the data storing unit 6 which corresponds to a number at the transmission counter (Step 504), and controls the radio unit 8 to transmit it by radio wave (Step 505).

As for a reception time slot in TDMA time frame corresponding to the radio wave transmission (For example, a reception time slot "Rx1" corresponds to a transmission time slot "Tx1") at the bottom of FIGS. 4 and 5, when the receiving unit 9 receives a data packet which includes reception information via the radio unit 8 (Step 506), and an error is detected in transmission of the same data packet (Step 507: failure), the controller 1 sets "1" to the error flag. On the other hand, if no error is detected in transmission of the data packet (Step 507: success) and the least significant bit of the reception information is 1 (Step 508: error), it sets "1" to the transmission flag, and increments the transmission counter by one (Step 511). If not error is detected in transmission of the data packet and the least significant bit of the reception information is other than 0, it skips to Step 511.

Upon each increment, the controller checks if the transmission counter does not reach its utmost value, 20. If the transmission counter does not reach 20 (Step 512: no), the controller 1 returns to Step 504 and repeats the above operation on the next radio frame until the transmission counter reaches 20.

When the transmission counter 20 reaches 20 (Step 512:yes), and the error flag is not 0 (Step 513: no), the controller 1 judges that an error occurs in the transmission of the data packet which includes the reception information. Therefore, the controller 1 returns to Step 503 to repeat the same operation so as to transmit difference image data for the same image frame again.

When the error flag is 0 (Step 513: yes), as well as the transmission flag is not 0 (Step 514: no), the controller 1 judges that the reception information includes an error (the subordinate terminal failed to receive). Then, the controller 1 returns to Step 502 to transmit difference image data for the next image frame and repeats the above operation on it. In this case, the content of the image storing unit 4 is not updated, so that the same reference frame is referred, but only an image frame to be encoded is updated to next one.

When the transmission flag is 0 (Step 514: yes), the controller 1 increments the transmission frame number by one (Step 515), controls the expansion adder 10 to expand the difference image data in the data storing unit 6 (Step 516), then moves to Step 502. Consequently, both the content (reference frame) of the image storing unit 4 and an image frame to be encoded are updated.

(configuration of image receiving unit )

Figure 7:
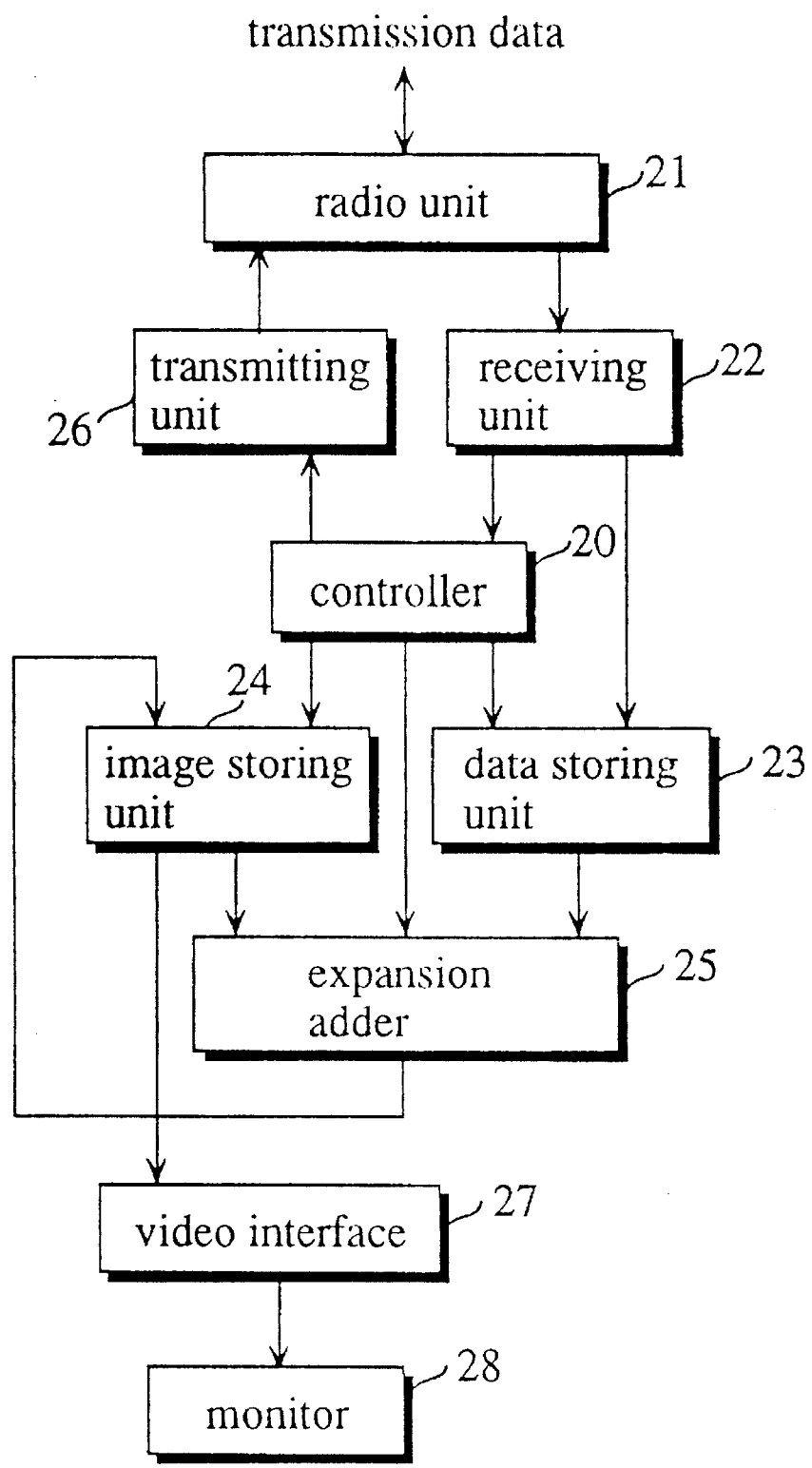
FIG. 7 is a block diagram showing the configuration of an image receiving unit 111 constructed at a subordinate terminal 110.

FIG. 7 is a block diagram showing the configuration of the image receiving unit 111 constructed at the subordinate terminal 110. The image receiving units 121 and 131 have the substantially same configuration as the image receiving unit 111, and the description of those will not be repeated.

The image receiving unit 111 comprises a controller 20, a radio unit 21, a receiving unit 22, a data storing unit 23, an image storing unit 24, an expansion adder 25, a transmitting unit 26, a video interface 27, and a monitor 28. The thus constructed image receiving unit 111 receives a data packet transmitted from its master terminal as monitoring a radio frame number included in it, and reproduces an image from difference image data included in the received data packet.

The radio unit 21 receives radio wave from the transmitting unit, and demodulates it. Also, the radio unit 21 modulates a data packet generated by the transmitting unit 26 to output its radio wave.

The receiving unit 22 establishes synchronization according to a synchronous patter included in a demodulated data packet to receive a data packet; simultaneously, it detects an error with reference to the error detection code included in the demodulated data packet as well as obtains a transmission frame number and difference compression data.

Controlled by the controller 20, the data storing unit 23 stores difference compression data obtained by the receiving unit 22.

The image storing unit 24 stores image data reproduced by the expansion adder 25 as new reproduction image data.

When receiving a expansion request from the controller 1, the expansion adder 25 extracts one radio frame of compression data from the data storing unit 23 and expands it, adds the expanded difference data to the reproduction image data in the image storing unit 24 so as to reproduce image data, then stores it into the image storing unit 24.

When receiving reception information from the controller 1, the transmitting unit 26 adds the error detection code and synchronous pattern to the same so as to generate one data packet.

The video interface 27 D/A converts reproduction image data to output analog image signals.

The monitor 28 receives input of analog image signals, and displays an image of the analog image signals.

The controller 20 controls reception of a data packet which includes radio frames, transmission of a data packet which includes reception information, and decoding of each image frame. More specifically, the controller 20 comprises a reception counter (not illustrated) which counts up upon each reception of a data packet which includes radio frames, and a second register (not illustrated) for storing a radio frame number which indicates how many image frames have been received safely so far, and a reception flag which indicates that a transmission error is included in a data packet received from the master terminal. The controller sets 20 times as utmost reception frequency (including re-transmission) per an image frame; upon each reception of one data packet which includes radio frames, controls to transmit reception information to its master terminal; then, if 20 radio frame receptions are carried out relevant for one image frame, controls to make another 20 receptions for the next image frame.

(detailed control by controller 20)

Figure 8:
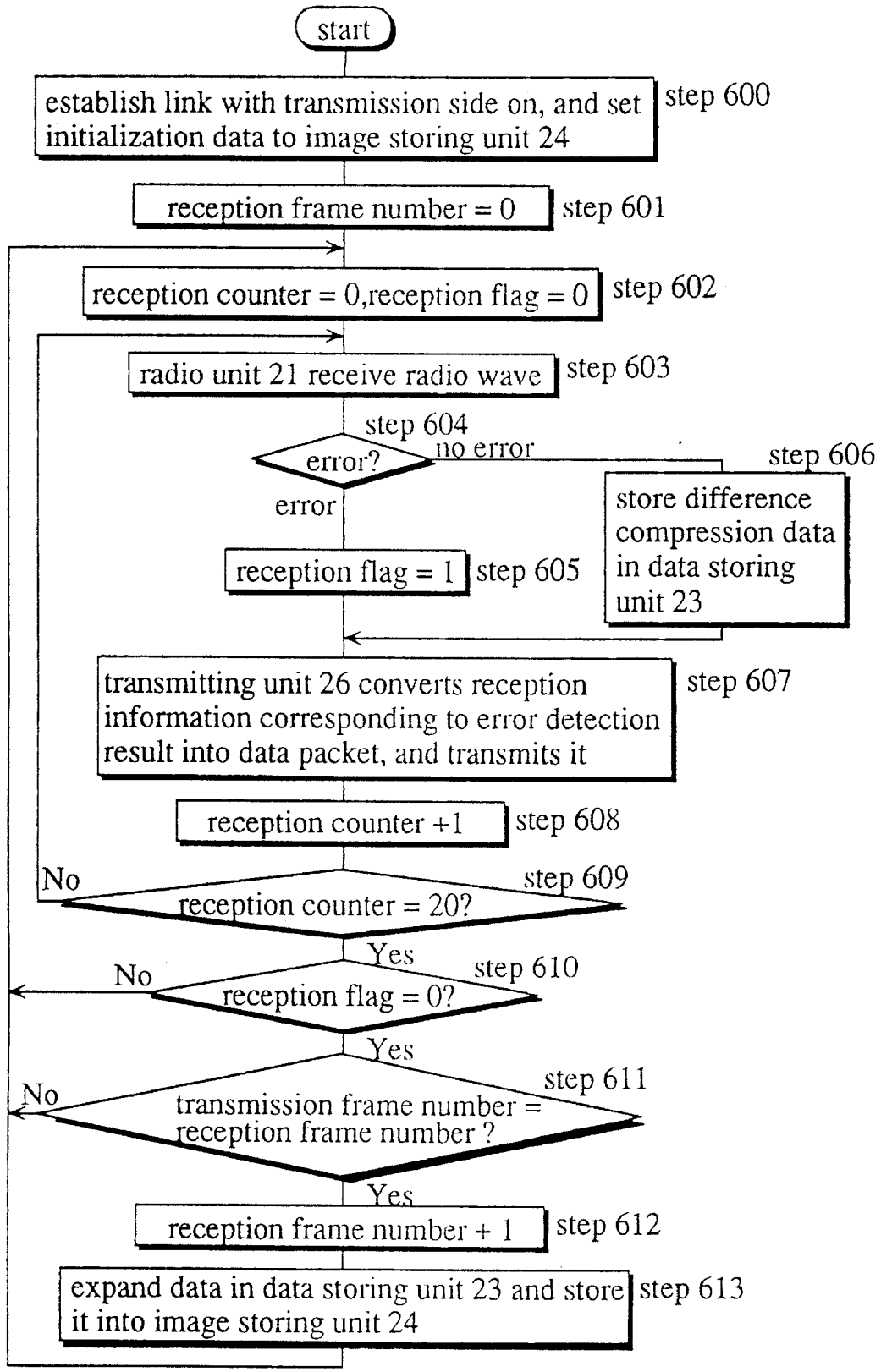
FIG. 8 is a flow chart describing control processing by a controller 20 in the image receiving unit.

FIG. 8 is a flow chart depicting detailed control processing by the controller 20. When the controller 20 establishes a radio link between itself and a master terminal, it sets the same initial data as the master terminal to the image storing unit 24, and resets the reception frame number to 0 (Steps 600, 601). Also, the controller 20 resets the reception counter and the second register to 0 (Step 602). When the receiving unit 22 receives a data packet from the master terminal via the radio unit 21 (Step 603), the controller 20 examines if a transmission error is included in the data packet. When an error is included in the data packet (Step 604: error), the controller 20 sets 1 to the reception flag. However, if no error is included in the data packet (Step 605: no error), the controller 20 stores difference image data included in the data packet into the data storing unit 23 (Step 606).

Then, the controller 20 sets the examination result into reception information (sets 1 when an error is detected at Step 605, and sets 0 when no error is detected), converts the reception information into a packet, and controls the radio unit 8 to transmit it (Step 607). Further, the controller 20 increments the reception counter by 1 (Step 608). Next, if the reception counter does not reach its utmost value, 20 (Step 609: no), the controller 20 returns to Step 603 to repeat the above operation until the reception counter reaches 20.

When the reception counter 20 reaches 20 (Step 609:yes), and the reception flag is not 0 (Step 610: error), the controller 20 returns to Step 602 to repeat the same operation so as to receive the next image frame. In this case, neither the reception frame number nor the content of the image storing unit 24 is not updated.

When the reception flag is 0 (Step 610: no error), and the transmission frame number included in the data packet does not coincide with the reception frame number held by itself (Step 611: no), the controller 20 returns to Step 602.

If they coincide (Step 611: yes), on the other hand, the controller 20 increments the reception frame number by 1 (Step 612), controls the expansion adder 25 to expand difference image data (one image frame) in the data storing unit stores it into the image storing unit 24 (Step 613), then returns to Step 602. In this case, the reception frame number is updated. Therefore, the transmission frame number held by the master terminal at Step 611 and the reception frame number held by the subordinate terminal remain identical.

(operation example)

The operation of the thus constructed high efficiency image transmission device (the image transmitting unit and the image receiving unit) is described hereunder.

Figure 9:
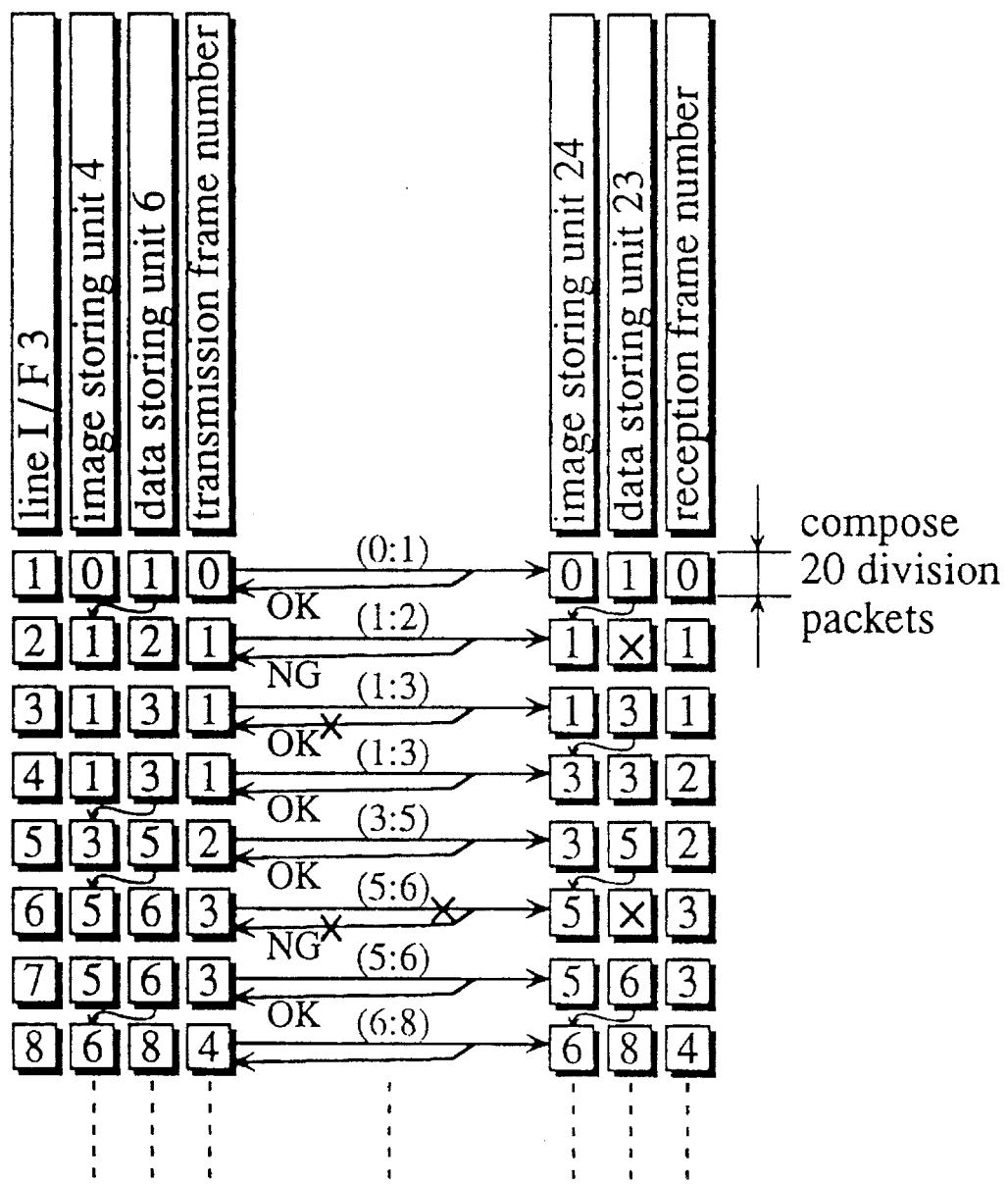
FIG. 9 shows a transmission and reception sequence which indicates transmission and reception of radio frames (20 frames) for one image frame.

FIG. 9 shows a transmission and reception sequence of a data packet between a master terminal and a subordinate terminal. The left side and right side of FIG. 9 represent a master terminal and a subordinate terminal respectively. The left side (master terminal) has an image frame received by the line interface 3, the content of the image storing unit 4, the content of the data storing unit 6, and a transmission frame number. The right side (subordinate terminal) has the content of the image storing unit 24, the content of the data storing unit 23, and a reception frame number. A right pointing arrow (→) represents 20 transmissions of data packets which include radio frames, and a left pointing arrow (←) represents 20 transmissions of data packets which include reception information. An arrow marked with a cross (x) indicates at least one of the 20 transmissions failed because of some trouble such as fading or the like; an arrow marked with OK indicates that all of the 20 transmissions were completed safely; and an arrow marked with NG indicates that an error was included in at least one of 20 reception information. Difference image data is enclosed with a parenthesis (). For example (1:2) represents a difference between an image frame 1 and an image frame 2. "0" in the image storing unit 4 represents initial data.

As shown in FIG. 9, different operations are carried out in the following four situations: (1) no transmission error occurs; (2) an error occurs in transmission of a data packet to a subordinate terminal; (3) an error occurs in transmission of a data packet to a master terminal; and (4) an error occurs both in transmission of a data packet to a subordinate terminal and in transmission of a data packet to a master terminal.

(1) If a transmission frame number coincides with a reception frame number (for example, 1st, 5th, and 8th image frame transmissions), the subordinate terminal updates the image storing unit 24 and the reception frame number; at the same time, the master terminal updates the image storing unit 4 and the transmission frame number. Consequently, the same reference frame is stored in the master terminal and the subordinate terminal (image storing unit 4/image storing unit 24), as well as the same number is stored as a transmission frame number and as a reception frame number. However, if a transmission frame number does not coincide with a reception frame number (for example, for the 4th image frame transmission), the master terminal and the subordinate terminal do not hold the same reference terminal any longer. Accordingly, the master terminal updates only the image storing unit 4, while the subordinate terminal updates only the reception frame number. As a result, the same reference frame is held by the master terminal and the subordinate terminal, and the transmission frame number and the reception frame number remain identical.

(2) When an error occurs in transmission of a data packet to a subordinate terminal (for example, 2nd image frame transmission), it seems apparent to a master terminal that its subordinate terminal does not update the image storing unit 24. Therefore, the master terminal does not update the image storing unit 4, and transmits difference image data relating to the next image frame.

(3) When an error occurs in transmission of a data packet to a master terminal (for example, 3rd image frame transmission), the master terminal is not sure if its subordinate terminal updates the image storing unit 24 and the reception frame number. Therefore, the master terminal repeats the same transmission without updating the image storing unit 4 and the transmission frame number. As a result, similarly to (1), the same reference frame is held by the master terminal and the subordinate terminal, and the transmission and reception numbers remain identical.

(4) When an error occurs in both transmissions (for example, 6th image frame transmission), the same operations as (3) are carried out.

[Embodiment 2]

A high efficiency image transmission device (image transmitting unit, image receiving unit) in FIG. 1 is applied to a simple digital codeless telephone system in a second embodiment.

(configuration of image transmitting unit)

Figure 10:
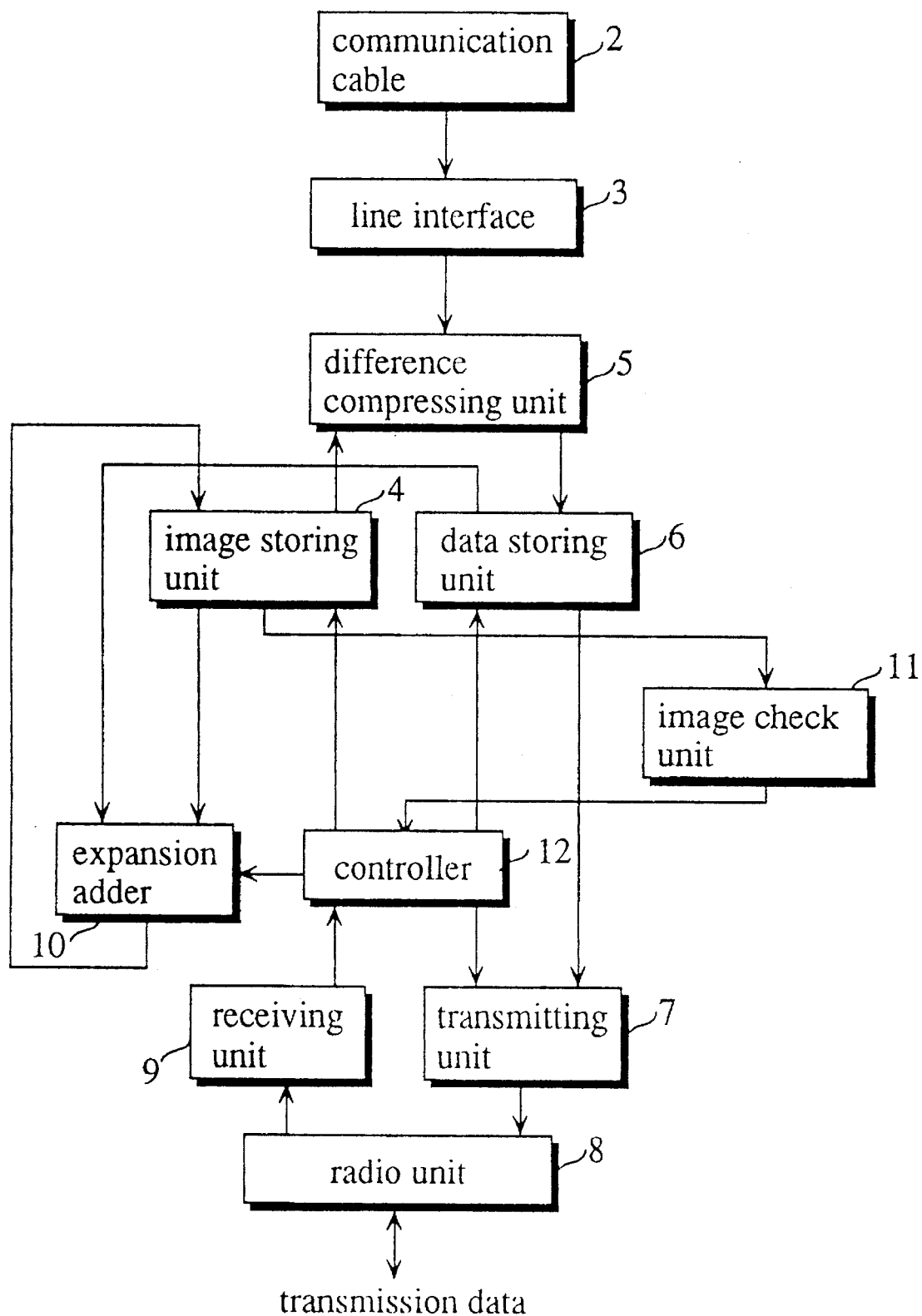
FIG. 10 is a block diagram showing the configuration of an image transmitting unit constructed at a master terminal in a second embodiment.

FIG. 10 is a block diagram depicting the configuration of an image transmitting unit constructed at a master terminal. Like components are labeled with like reference numerals with respect to the first embodiment, and the description of these components is not repeated. The second embodiment is different from the first embodiment in that an image check unit 11 is constructed, and the controller 1 is replaced with a controller 12.

Figure 11:
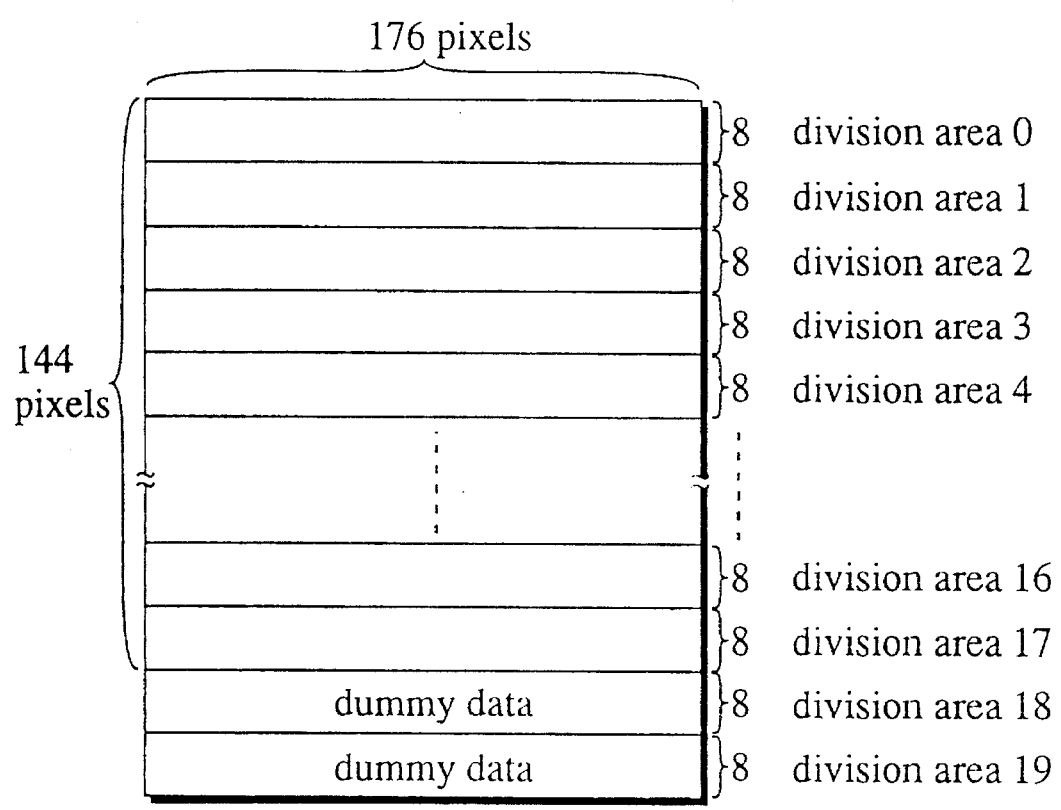
FIG. 11 shows how reproduction image data in image staring units 4 and 24 is divided by an image check units 11 and 29.

Controlled by the controller 12, the image check unit 11 divides reproduction image data in the image storing unit 4 into a plurality of areas, and generates CRC (Cyclic Redundancy Check) code for reproduction image data within each area. FIG. 11 shows how reproduction image data in the image storing unit 4 is divided by the image check unit 11. The reproduction image data in FIG. 11 is QCIF (176pixels× 144pixels) in the first embodiment, and one reproduction image data is divided into 18 division areas, as well as two division areas for storing dummy data are added to them. Thus by constructing two dummy data areas, the total number of division areas coincides with the utmost transmission counting number, 20. Each division area stores 176×8 pixels, and it corresponds to a counting number at the transmission counter.

The controller 12 checks if the same reproduction image is held by the transmitting unit and the receiving unit according to CRC codes besides possessing the same capabilities of the controller 1 in the first embodiment. To be concrete, upon each reception of reception information, the controller 12 compares CRC codes included in the reception information and CRC codes generated by the image check unit 1. If they do not coincide with each other, the controller 1 initializes reproduction image data for the respective radio frame, and includes an initialization flag into transmission information to notify the image receiving unit to initialize reproduction image data for the corresponding radio frame.

Figure 12:
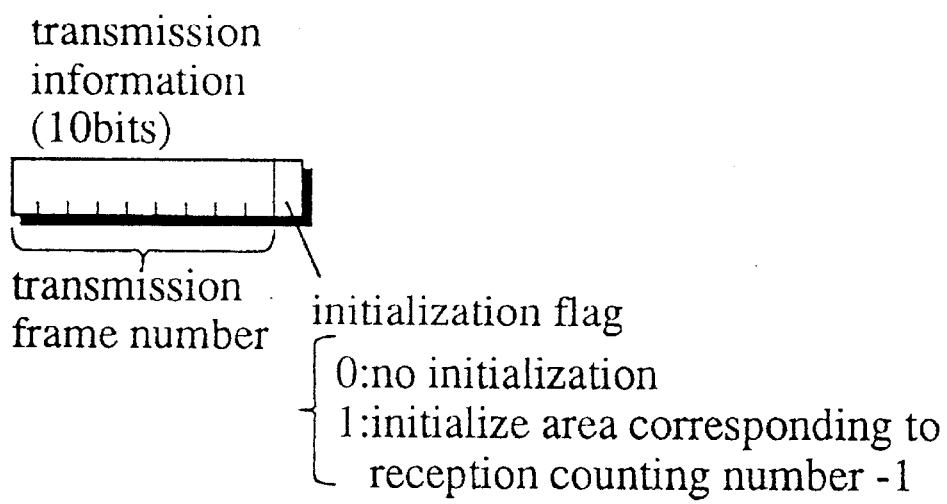
FIG. 12 shows a format example of transmission information which includes initialization information in the second embodiment.
Figure 13:
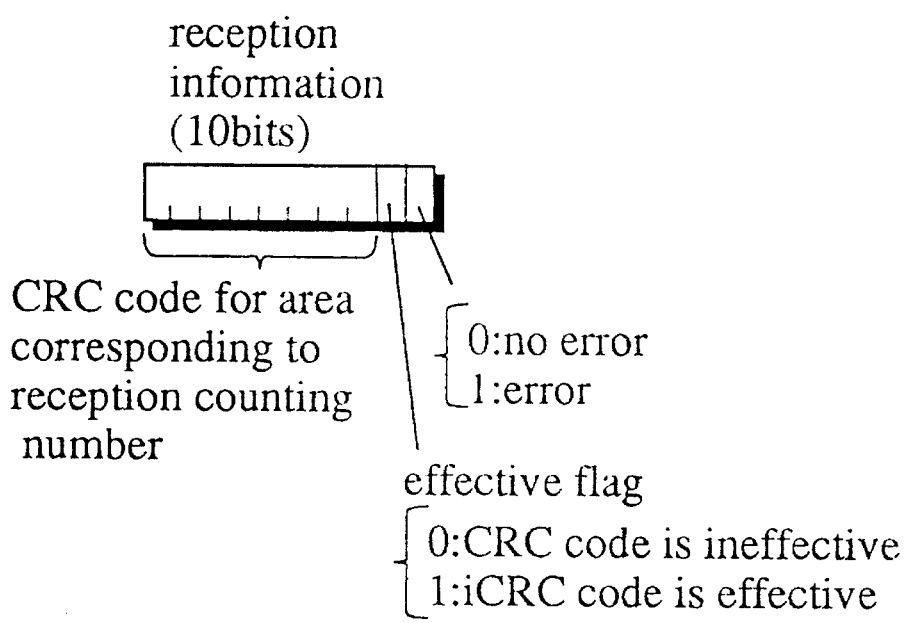
FIG. 13 shows a format example of reception information which includes a CC code in the second embodiment.

FIG. 12 is an exemplary format of transmission information which includes an initialization flag; and FIG. 13 is an exemplary format of reception information which includes CRC code. The transmission information and the reception information in FIGS. 4 and 5 are replaced with the transmission information and the reception information in FIGS. 12 and 13 respectively. In FIG. 12, an initialization flag is 1-bit data where "0" indicates not to initialize reproduction image data while "1" indicates to initialize reproduction image in the division area corresponding to a counting number-1 at the reception counter. In FIG. 13, CRC code is 8-bit data, and an effective flag indicates if 8-bit CRC code is effective or not.

(detailed control by controller 12)

Figure 14:
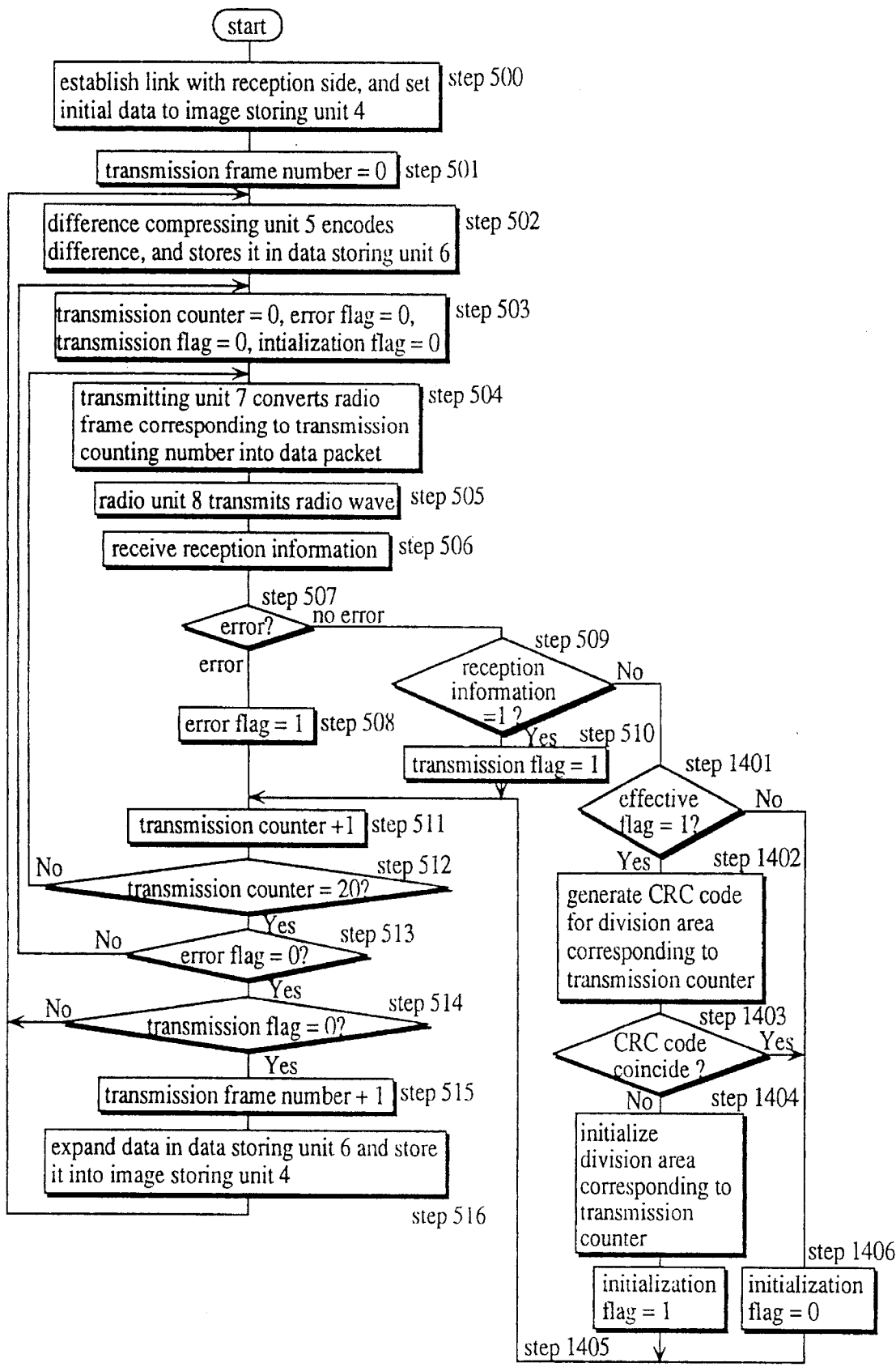
FIG. 14 is a flow chart describing detailed control processing by a controller 12.

FIG. 14 is a flow chart depicting detailed control by the controller 12. FIG. 14 is different from FIG. 6 in that the initial flag is set to 0 at Step 503, also Steps 1401–1406 are added, and only these three steps are described.

When the receiving unit 9 does not detect any transmission error (Step 507: success), and reception information does not include any error (Step 509: no error), the following operations are carried out. If the effective flag included in the reception information is 1 (Step 1401), the controller 12 controls the image check unit 11 to generate CRC code for a division area in the image storing unit 4 which corresponds to a value at the transmission counter (Step 1402), and checks if CRC code included in the reception information coincides with the generated CRC code. If they coincide with each other (Step 1403: yes), the controller 12 judges that the same image data for the division area is stored in the master terminal and the subordinate terminal. Accordingly, it resets the initial flag to 0 (Step 1406). When they coincide with each other (Step 1403: no), on the other hand, the controller 12 judges that different image data is stored in the master terminal and the subordinate terminal for the same division area, so that it initializes reproduction image within the division area (which corresponds to a counting number at the transmission counter) in the image storing unit 4 (Step 1404), and sets 1 to the initialization flag so that the subordinate terminal also initializes reproduction image the division area (Step 1405).

Hereinafter, the same operations as the first embodiment are carried out except that the initialization flag is included in transmission information. Only such difference will be described.

(configuration of image receiving unit)

Figure 15:
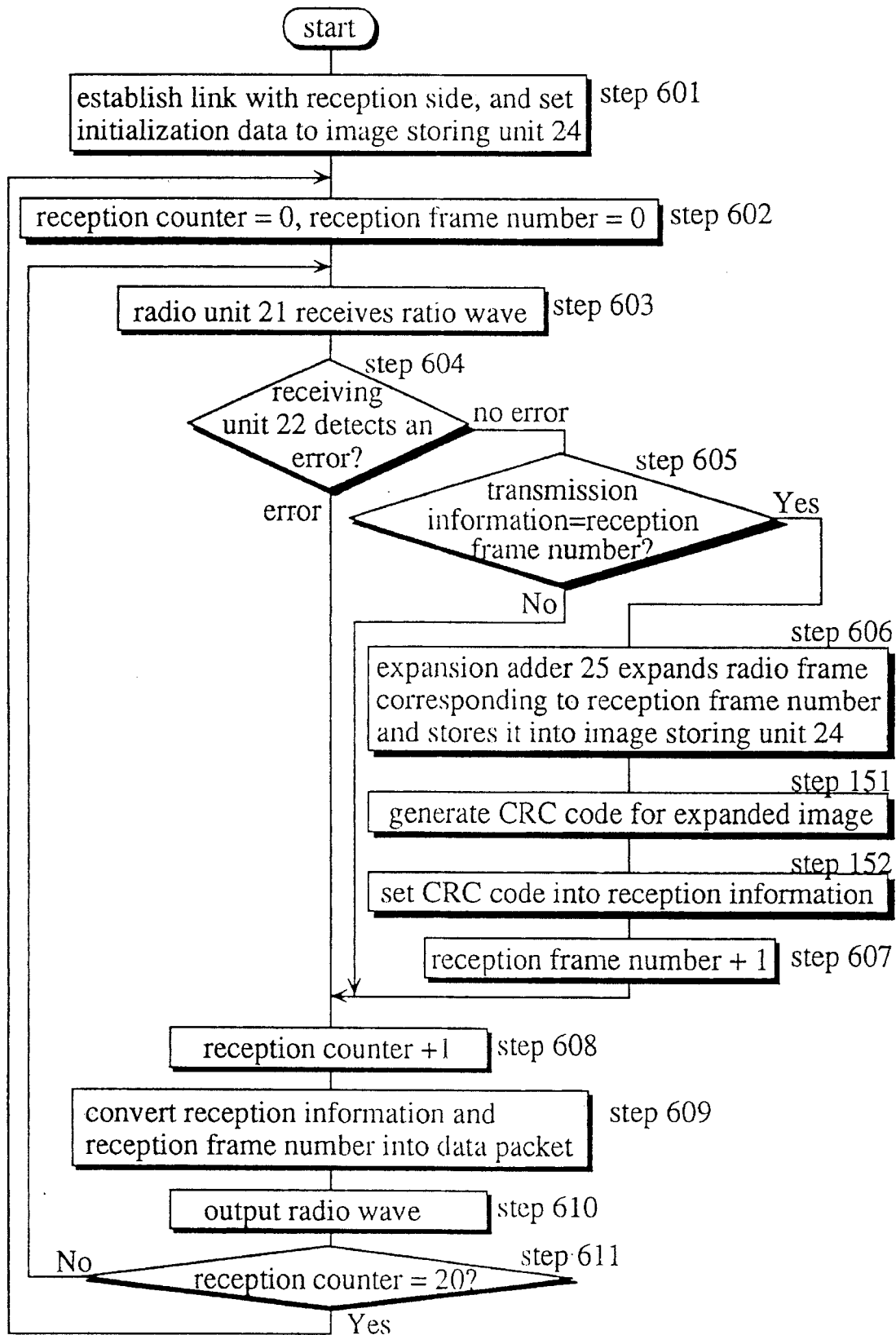
FIG. 15 is a block diagram showing the configuration of an image receiving unit constructed at a subordinate terminal in the second embodiment.

FIG. 15 is a block diagram showing the configuration of an image receiving unit constructed at a subordinate terminal. Like components are labeled with like reference numerals with respect to the first embodiment, and the description of these components is not repeated. The image receiving unit in FIG. 15 is different from the image receiving unit in the first embodiment only in that an image check unit 29 is added, and the controller 20 is replaced with a controller 30.

Controlled by the controller 30, the image check unit 29 divides reproduction image data in the image storing unit 24 into a plurality of areas, and generates CRC (Cyclic Redundancy Check) code for reproduction image data within each area. Division of reproduction image data in the image storing unit 24 by the image check unit 29 is substantially same as that by the image check unit 11 in FIG. 11.

The controller 30 generates CRC code for a division area corresponding to a counting number at the reception counter and sets the CRC code and an effective flag into reception information, besides having the same capabilities of the controller 12 in the first embodiment.

(detailed control by controller 30)

Figure 16:
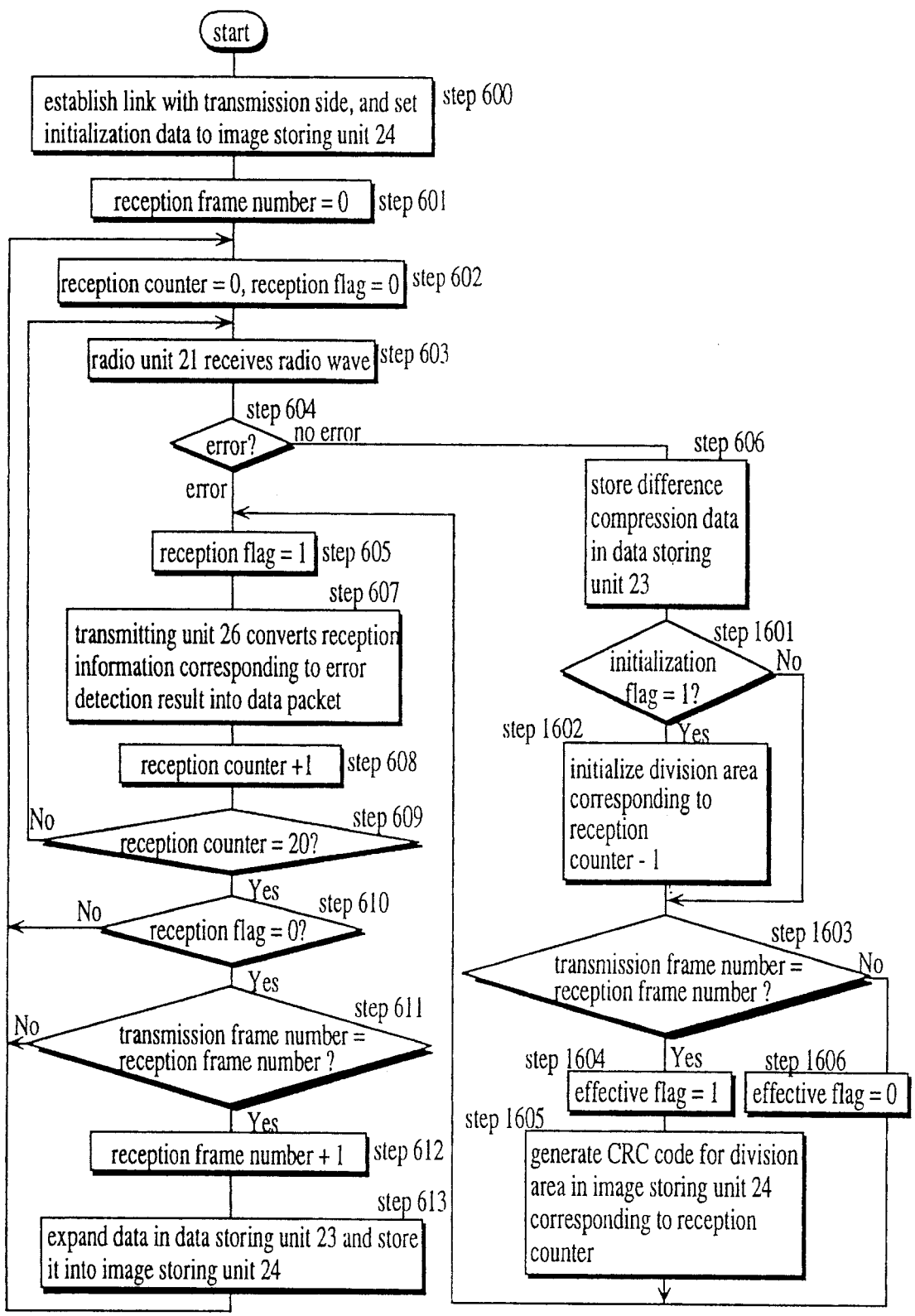
FIG. 16 is a flow chart describing a detailed control processing by a controller 30.

FIG. 16 is a flow chart depicting detailed control by the controller 30. FIG. 16 is different from FIG. 8, which describes the operation of the controller 12, in that Steps 1601–1606 are added, and only these steps are described.

After storing difference image data for a radio frame included in the reception frame into the data storing unit 23 (Step 606), the controller 30 judges if the initial flag in transmission information is set. When the initial flag is set (Step 1601: yes), the controller 30 initializes reproduction image data in a division area which corresponds to a counting number-1 at the reception counter. When the initial flag is not set (Step 601: no), the controller 30 does not operate initialization.

Subsequently, the controller 30 compares a transmission frame number in transmission information with a reception frame number in the second register. If they coincide with each other (Step 1603: yes), the controller 30 sets 1 to the effective flag (Step 1604), controls the image check unit 11 to generate CRC code for a division area in the image storing unit 24 which corresponds to a counting number at the reception counter, and sets the CRC code and the effective flag into reception information (Step 1605). If a transmission frame number in transmission information does not coincide with a reception frame number in the second register (Step 1603: no), on the other hand, the controller 30 sets 0 to the effective flag since the content of the image storing unit 4 at the master terminal and content of the image storing unit 24 may not be identical to each other (Step 1606), and it does not generate CRC code.

The controller 30 moves to Step 607 to operate the same as the first embodiment except that the CRC code and the effective code are set into reception information.

(operation example)

The operation of the thus constructed high efficiency image transmission device (image transmitting unit and image receiving unit) in the second embodiment is described.

Figure 17:
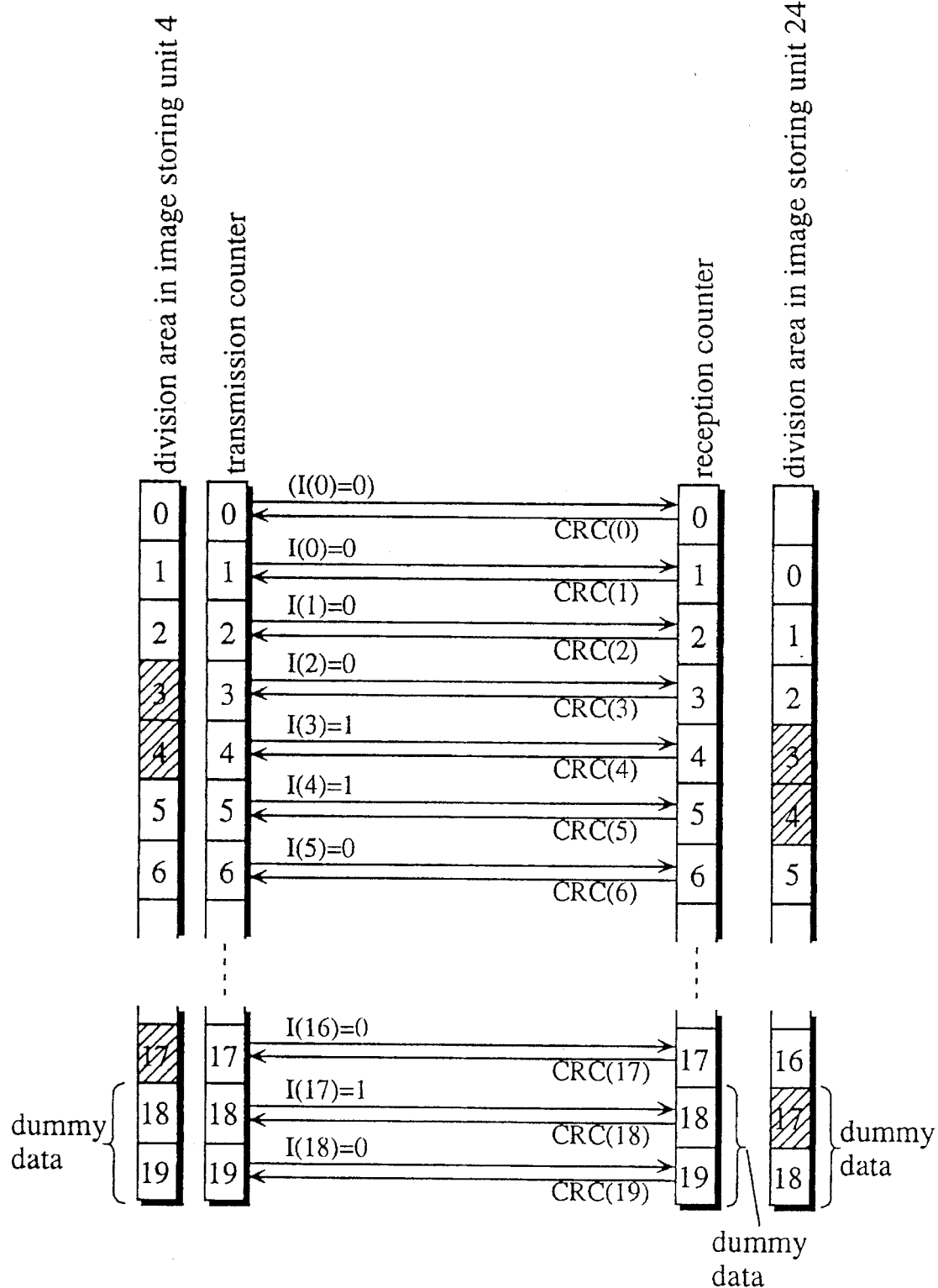
FIG. 17 shows a transmission and reception sequence which indicates transmission and reception of radio frames (20 frames) for one image frame.

A transmission and reception sequence in this embodiment is substantially same as the transmission and reception sequence in FIG. 9 except that it can be examined if the image storing unit 4 and the image storing unit 24 are identical in their contents as referring to transmission information and reception information. FIG. 17 is a transmission and reception sequence which shows transmissions and receptions of 20 data packets at the fifth transmission and reception in FIG. 9 (both the image storing units 4 and 24 store a reproduction image 3, and both transmission and reception frame numbers are 2).

The left side and the right side of FIG. 9 represent transmission side and reception side respectively. The left side has the content of the image storing unit 4, and a counting number at the transmission counter. Similarly, the right has the content of the image storing unit 24, and a counting number at the reception counter. Both the image storing units 4 and 24 stores the reproduction image 3. CRC (n) on an data packet arrow indicates that CRC code for an n-th division area in the image storing unit 24 is set into reception information; and I(n) indicates that an initial flag which directs initialization of an n-th division area is set into transmission information.

The transmission counter counts 0 immediately after resetting at Step 503. In this case, 0 is always set for I(n), that is I(0); and the initialization flag does not make any change in practical terms.

When the transmission counter counts 1, however, 0 is set for I(n) depending on the comparing result of CRC code. Therefore, the initialization flag implements its purpose.

In FIG. 17, it is assumed that CRC (3), CRC (4), CRC (17) do not coincide with CRC included in reception information. Accordingly, division areas 3, 4, 17 in the image storing unit 4, which are hatched in FIG. 17, are initialized. At reception side, 1 is set to I(3), I(4), and I(17) so that the division areas 3, 4, 17 in the image storing unit 24 are also initialized.

Although PHS system links between a master terminal and a subordinate terminal in the above embodiments, another radio system may link them. For example, when a radio LAN, such as a wave LAN, links a master terminal and a subordinate terminal to realize high-speed transmission, more than 3000 bit difference image data can be transmitted relating to one image frame. Also, a radio fame can be divided into less than 20 frames. For example, to transmit 10000-bit data, and to generate one division area, the transmitting unit 7 generates a data packet which includes 10000-bit difference image data; also the controllers 1, 12, 20, and 30 examine if the transmission counter and the reception counter count 1 (Step 512 in FIGS. 6 and 14, Step 609 in FIGS. 8 and 15).

Although the transmission counter and the reception counter determine 20 as their utmost counting numbers in the above, their utmost counting numbers may be determined according to the data transmission amount for one image frame, and the transmission rate.

Step 1404 and Step 1602 in FIG. 16 may be placed after Step 516 and Step 613 respectively. In this case, a reference result and a counting number at the transmission counter are stored at Step 1403, while the initialization flag and a counting number at the reception counter are stored at Step 1601.

[Embodiment 3]

A third embodiment is different from the second embodiment in the following operations by controllers 12 and 20. When a transmission error occurs, a data packet is re-transmitted basing upon a radio frame unit. Also, a match between image storing units 14 and 24 is examined by a subordinate terminal.

The configurations of a master terminal and a subordinate terminal are substantially same as the second embodiment in FIGS. 11 and 15, and only differences will be described hereinafter.

Figure 18:
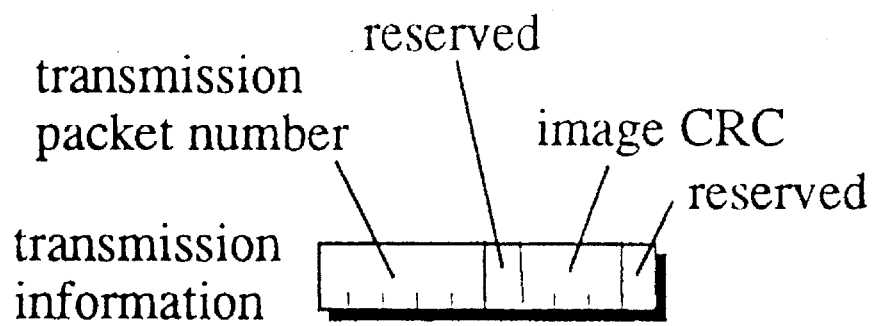
FIG. 18 shows transmission information in a third embodiment.
Figure 19:
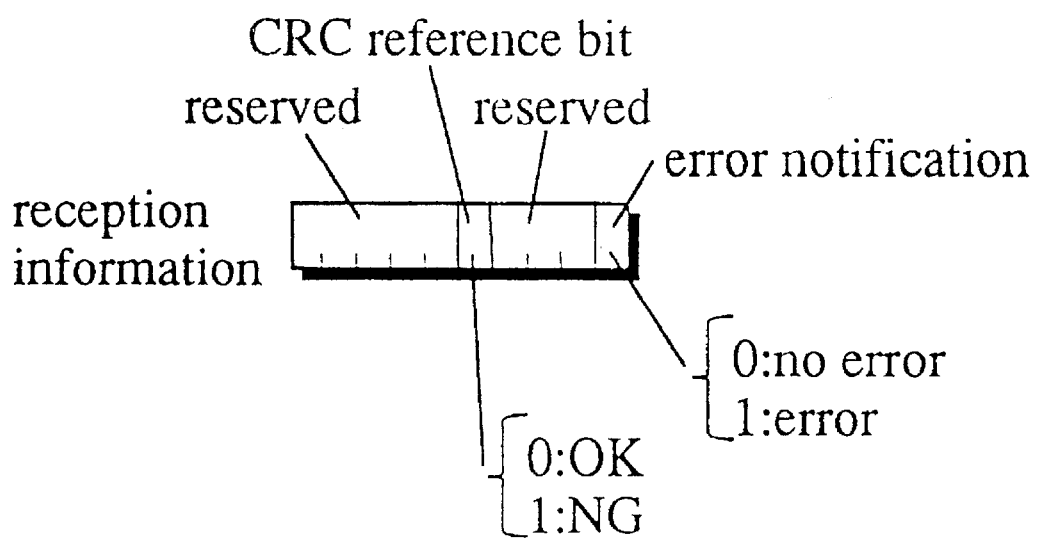
FIG. 19 shows reception information in the third embodiment.

FIGS. 18 and 19 show transmission information and reception information respectively. In FIGS. 18 and 19, the cell of transmission packet number indicates what number of radio frame is included in the data packet, counting from the beginning. The cell of image CRC indicates CRC code relating to a division area which corresponds to a counting number at the transmission counter. The cell of CRC reference bit indicates a result of the comparison of CRC codes by a subordinate terminal (0 for OK and 1 for NG). The cell of error notification bit is the same as the least significant bit of reception information in the second embodiment.

Figure 20:
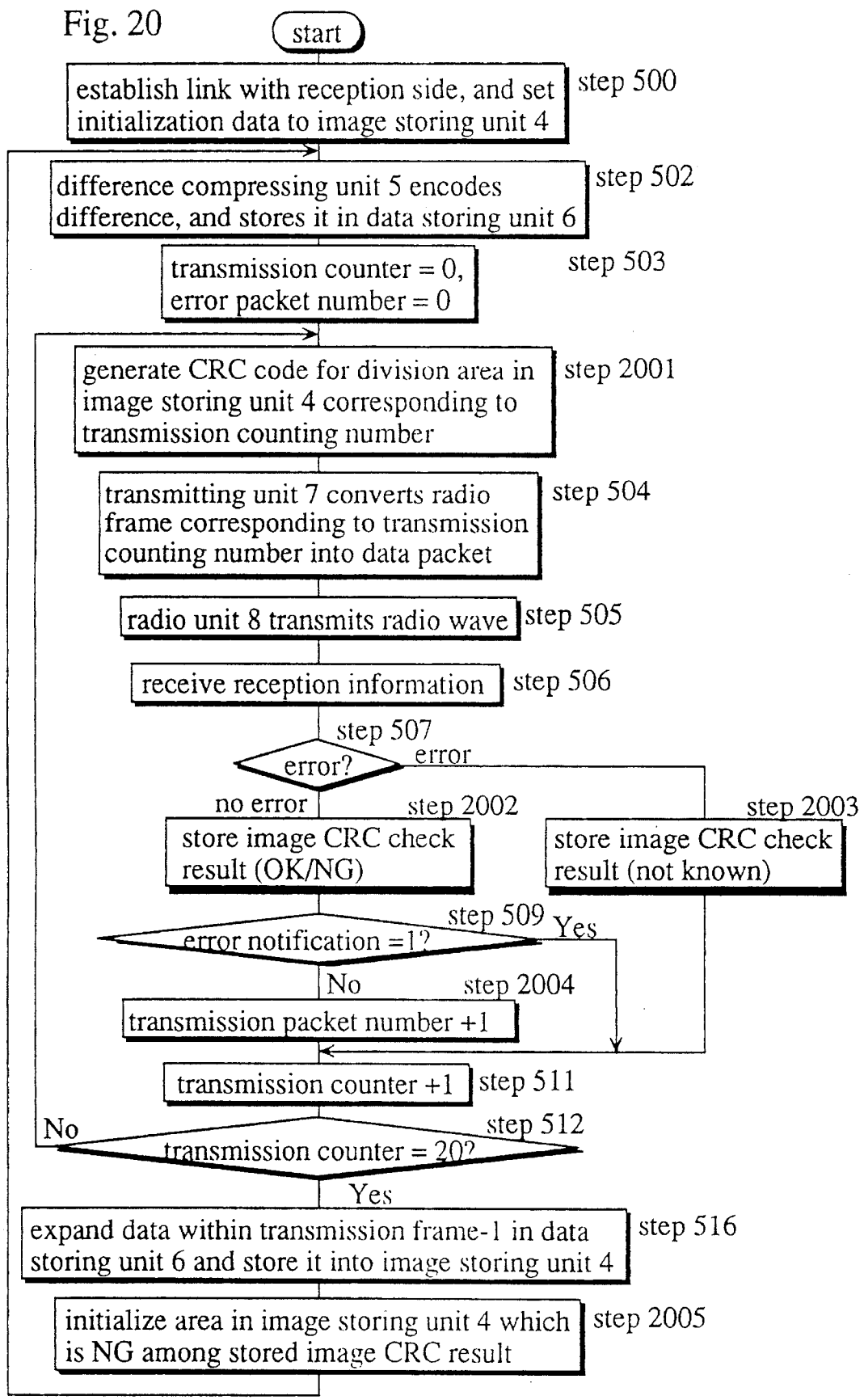
FIG. 20 is a flow chart describing a detailed control processing by a controller 12 in the third embodiment.
Figure 21:
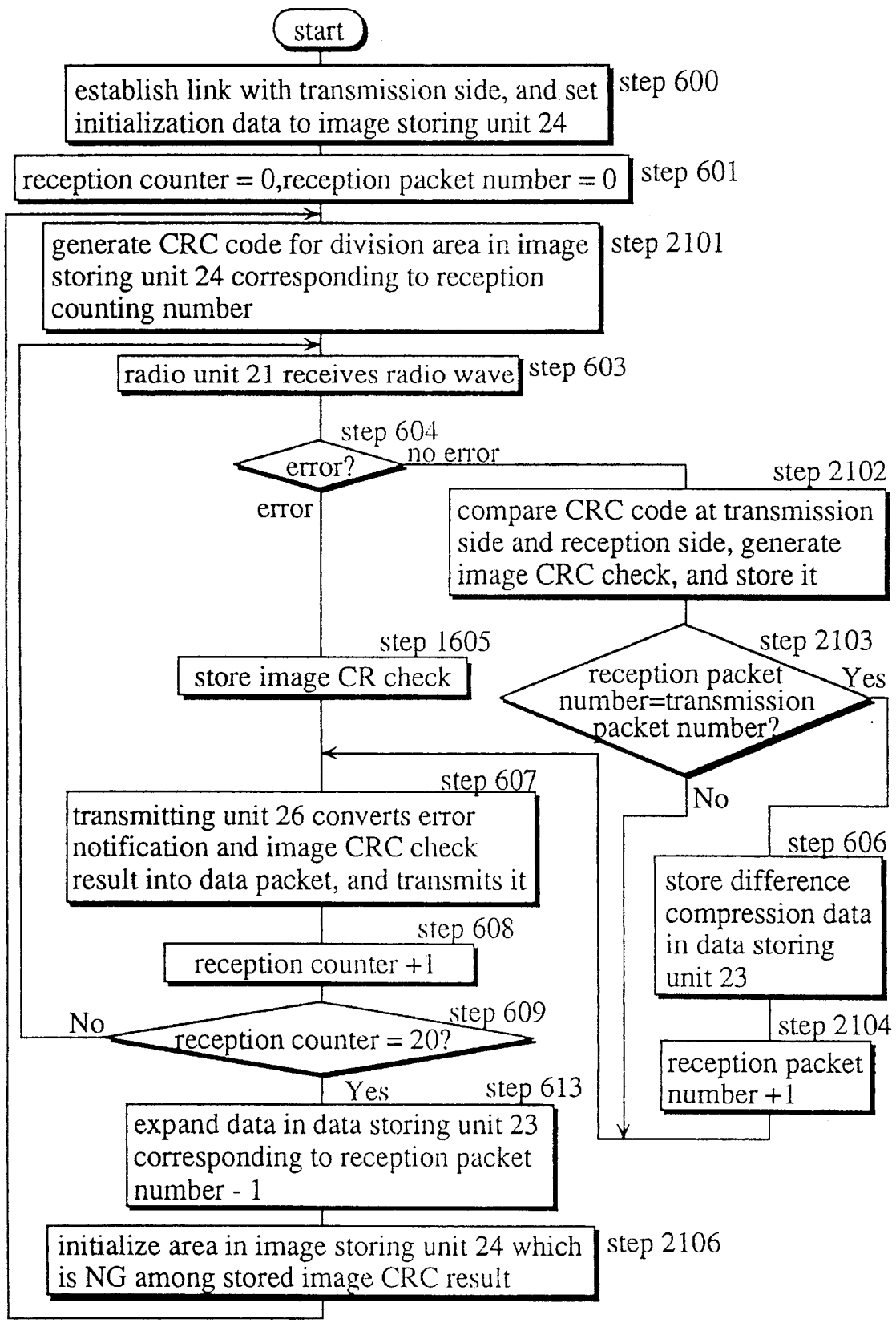
FIG. 21 is a flow chart describing a detailed control processing by a controller 30 in the third embodiment.
Figure 15:
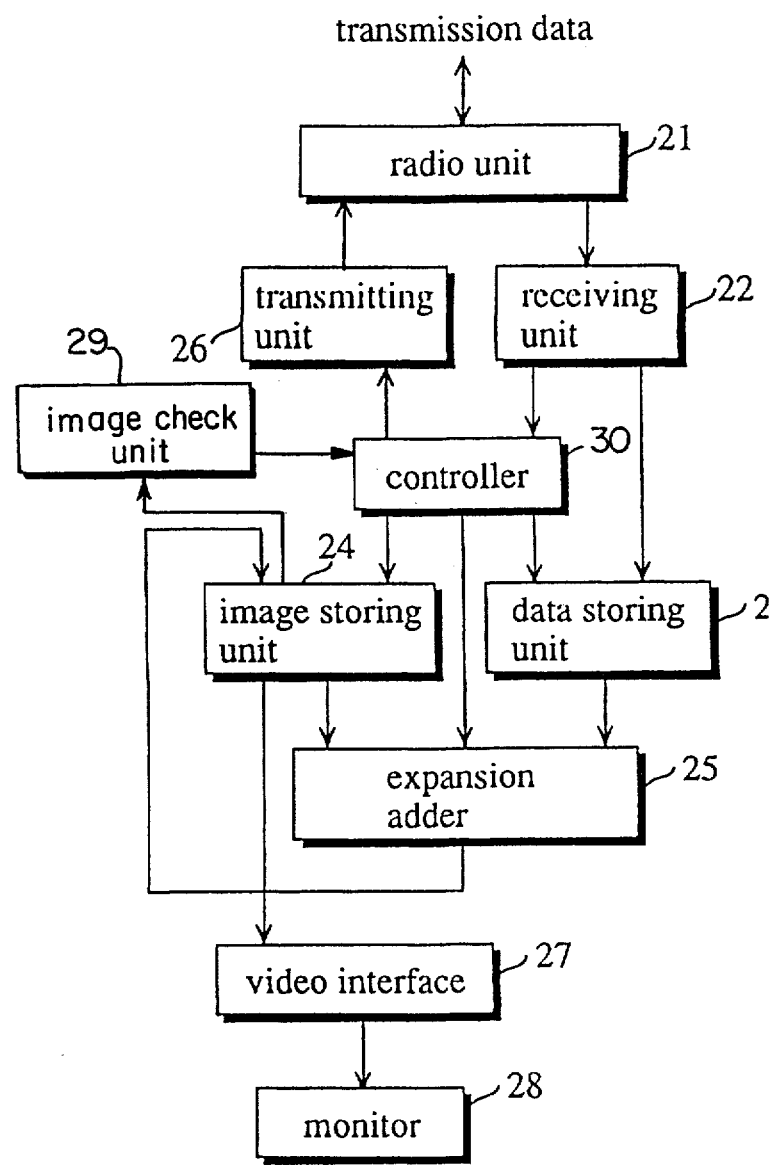

FIGS. 20 and 21 are flow charts describing detailed control processing by the controllers 12 and 30 respectively. A master terminal encloses CRC code for each division area into transmission information, and transmits it to a subordinate terminal (Steps 2001, 504, 505). Receiving the transmission information, the subordinate terminal compares the CRC code with CRC code for the corresponding division area within the image storing unit 24, then encloses the comparison result into reception information and transmits it to the master terminal (Steps 2102, 607). The controllers 12 and 30 repeat these operations for a single image frame in cooperation. When the content of the image storing unit 4 is different from that of the image storing unit 24, a counting number at the transmission counter and a reference bit at the moment are stored. Accordingly, upon each updating of the image storing unit 4, the controller initializes a division area which does not coincide with its counterpart as referring to a counting number and a reference bit stored (Step 2006). Similarly, the controller 30 initializes a division area (Step 2106).

Re-transmission of a data packet is described. When reception information includes a reception error, a transmission packet number is not incremented. Similarly, when an error is detected, a reception packet number is not incremented. As a result, it is possible to re-transmit a data packet.

Thus, re-transmission of a data packet for each, radio frame is realized. Also, a match between the image storing units 4 and 24 is assured.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A transmitting device for encoding to compress an animated image including a plurality of image frames by detecting a difference between one image frame to be encoded and a reference image frame, then transmitting data of the encoded image to a receiving device by a radio line at high efficiency, the transmitting device comprising:

an image storing means for storing the reference image frame which is referred to detect the difference relating to the image frame to be encoded;

an initialization means for, before a first transmission, initializing the image storing means by initial data which is identical to initial data held by the receiving device;

a difference encoding means for detecting the difference between the image frame to be encoded and the reference image frame, and encoding to compress the difference;

an encoded data storing means for storing the encoded difference data received from the difference encoding means;

a transmitting means for detecting an error detection code in the encoded difference data, and transmitting the encoded difference data together with transmission information including the error detection code to the receiving device;

a receiving means for receiving reception information from the receiving device, the reception information including information which indicates whether the receiving device finds either OK or NG as a result of error detection check which is based on the error detection code;

a reproducing means for decoding to reproduce the encoded difference data stored in the encoded data storing means, then storing it as one reference frame into the image storing means when the received reception information indicates OK; and a controlling means for controlling the difference encoding means to encode to compress the next image frame when the received reception information indicates NG, while controlling the difference encoding means to encode to compress the next image frame only after the reproducing means stores a new reference image frame when the received reception information indicates OK.

2. The transmitting device of claim 1, wherein the transmitting means divides the encoded difference data into a plurality of radio frames, and transmitting each radio frame and transmission information which includes the error detection code which corresponds to the radio frame to the receiving device;

the receiving means receives from the receiving, device the reception information which corresponds to the transmitted radio frame; and the controlling means controls the reproducing means to reproduce the encoded difference data for a single image frame when all the reception information for it indicates OK, while the controlling means controls the difference encoding means to encode the difference for a next image frame when at least one of the reception information for a single image frame indicates NG.

3. The transmitting device of claim 2, wherein each radio frame is fixed length, and an excess of encoded data over the data amount of a predetermined number of radio frames is abandoned.

4. The transmitting device of claim 3, wherein the transmission information includes a transmission frame number which indicates the number of image frames which have been transmitted safely; and the controlling means increments the transmission frame number by one upon each updating of the reference image frame in the image storing means by the reproducing means, whereby the receiving device can check if its own reference image frame is identical to the reference image frame stored in the transmitting device.

5. The transmitting device of claim 4, wherein the initialization means initializes the image storing means when a radio link is established between the transmitting device and the receiving device.

6. The transmitting device of claim 1 further comprising:

an error detection/correction code generating means for generating an error detection/correction code relating to the reference image frame in the image storing means, wherein the reception information received by the receiving means includes the error/correction code relating to the reference image frame stored in the receiving device; and the controlling means controls the initialization means to compare the error detection/correction code included in the reception information received by the receiving means with the error detection/correction code generated by the error detection/correction code generating means, and controls the initialization means to initialize the reference image frame stored in the image storing means when they do not coincide with each other, as well as controls the transmitting means to transmit the transmission information which directs to initialize the reference image frame stored in the receiving device.

7. The transmitting device of claim 6, wherein the transmitting means divides the encoded difference data into a plurality of radio frames, and transmitting each radio frame and the transmission information which includes the error detection code which corresponds to the radio frame to the receiving device;

the receiving means receives the reception information which corresponds to the transmitted radio frame from the receiving device;

the controlling means controls the reproducing means to reproduce the encoded difference data for a single image frame when all the reception information for it indicates OK, while the controlling means controls the difference encoding means to encode the difference for a next image frame when at least one of the reception information for a single image frame indicates NG;

the error detection/correction code generating means divides each reference image frame in the image storing means into a plurality of areas, and generates the error detection/correction code for each area; and the controlling means operates the comparison as for each area, and, when it does not coincide with that in the receiving device, controls the transmitting means to transmit the transmission information which directs to initialize the area in the receiving device.

8. The transmitting device of claim 7, wherein the transmission information includes a transmission frame number which indicates the number of image frames which have been transmitted safely; and the controlling means increments the transmission frame number by one whenever the reproducing means updates the reference image frame in the image storing means, whereby the receiving device can check if its own reference image frame coincides with the reference image frame in the transmitting device.

9. The transmitting device of claim 8, wherein the error/correction code is CRC (Cyclic Redundancy Check) code relating to the image data in the area.

10. The transmitting device of claim 6, wherein the error detection/correction code generating means divides the reference image frame in the image storing means into a plurality of areas, and generates the error detection/correction code relating to each area;

the transmitting means divides the encoded difference data into a plurality of radio frames, and transmits the transmission information which includes each radio frame, the error detection code corresponding to the radio frame, and the error detection/correction code corresponding to the area to the receiving device;

the receiving means receives the reception information from the receiving device which includes a check result according to the error detection code, and information which indicates if the area corresponding to the error detection/correction code is identical to one of areas into which the reference image frame in the receiving device is divided; and the controlling means controls the transmitting means to transmit the radio frame which was transmitted at the last transmission together with the error detection/correction code for the next area when the check result included in the reception information indicates an error, also controls the initialization means to initialize all the areas which are not identical to those in the receiving device according to the reception information after the error detection/correction codes for all the areas are transmitted and the reference image frame in the image storing means is updated.

11. A receiving device for receiving encoded difference data at high efficiency from a transmitting device via a radio line, the receiving device comprising:

an image storing means including an area where a reproduced image basing upon the encoded difference data is stored;

an initialization means for initializing the image storing means by initial data which is identical to initial data held by the transmitting device;

a receiving means for receiving the encoded difference data from the transmitting device, and detects an error according to an error detection code included in transmission information which was transmitted together with the encoded difference data;

an encoded data storing means for storing the encoded difference data received by the receiving means;

a reproducing means for decoding the encoded difference data in the encoded data storing means when a result of the error detection is OK, reproducing the image frame by adding the decoded data to content of the image storing means, and storing the reproduced image frame into the image storing means;

a controlling means for generating reception information which includes the result of the error detection by the receiving means; and a transmitting means for transmitting the reception information to the transmitting device.

12. The receiving device of claim 11, wherein the receiving means receives radio frames into which the encoded difference data is divided; and the controlling means controls the reproducing means to reproduce one image frame of the encoded difference data when the error detection result as for all of the radio frames included in it is OK.

13. The receiving device of claim 12, wherein the receiving means receives the transmission information which includes a transmission frame number indicating how many image frames are transmitted safely together with the encoded difference data;

the controlling means holds a reception frame number indicating how many image frames are received safely and increments the reception frame number by one whenever the reproducing means updates the reference image frame in the image storing means; and the reproducing means decodes the encoded difference data when the result of the error detection is OK as well as the transmission frame number coincides with the reception frame number.

14. The receiving device of claim 13, wherein the initialization means initializes the image storing means when a radio link is established between the transmitting device and the receiving device.

15. The receiving device of claim 11 further comprising an error detection/correction code generating means for generating an error detection/correction code relating to a reference image frame stored in the image storing means, wherein the transmission information includes information which directs whether or not the reference image frame in the image storing means should be initialized; and the controlling means generates reception information which includes the generated error detection/correction code, controls the transmitting means to transmit the reception information, and controls the initialization means to initialize the reference image frame in the image storing means when the information included in the transmission information received by the receiving means directs the initialization.

16. The receiving device of claim 15, wherein the receiving means receives radio frames into which the encoded difference data is divided;

the controlling means controls the reproducing means to reproduce one image frame of the encoded difference data when the error detection result relating to all of the radio frames included in it is OK;

the error detection/correction code generating means divides each reference image frame in the image storing means into a plurality of areas, and generates the error detection/correction code for each area; and the controlling means further generates the reception information including the error detection/correction code corresponding to each area, and controls the transmitting means to transmit the reception information.

17. The receiving device of claim 16, wherein the receiving means receives the transmission information which includes a transmission frame number indicating how many image frame are transmitted safely together with the encoded difference data;

the controlling means holds a reception frame number indicating how many image frames are received safely and increments the reception frame number by one whenever the reproducing means updates the reference image frame in the image storing means; and the reproducing means decodes the encoded difference data when the result of the error detection is OK as well as the transmission frame number coincides with the reception frame number.

18. The receiving device of claim 17, wherein the error detection/correction code is CRC (Cyclic Redundancy Check) code relating to the image data in the area.

19. The receiving device of claim 15, wherein the error detection/correction code generating means divides the reference image frame in the image storing means into a plurality of areas, and generates the error detection/correction code relating to each area;

the receiving means receives the transmission information which includes one of the radio frames into which the encoded difference data is divided, the error detection code corresponding to the radio frame, and the error detection/correction code relating to the corresponding area in the transmitting device;

the transmitting means transmits the reception information which includes a check result according to the error detection code, and information which indicates if the area corresponding to the error detection/correction code is identical to one of areas into which the reference image frame in the transmitting device is divided; and the controlling means examines if the area which is received according to the error detection/correction code included in the transmission information is identical to the area, and when the error detection/correction codes for all the areas are transmitted, as well as the reference image frame in the image storing means is updated, initializes all the areas in the image storing means which are not identical to those in the transmitting device according to the reception information.

20. A high efficiency transmitting system which comprises a transmitting device and a receiving device for encoding to compress an animated image which includes a plurality of image frames by detecting a difference between one image frame to be encoded and a reference image frame, then transmitting data of the encoded image to a receiving device by a radio line at high efficiency, wherein the transmitting device comprises:

a first image storing means for storing the reference image frame which is referred to detect the difference relating to the image frame to be encoded;

a first initialization means for, before a first transmission, initializing the image storing means by initial data which is identical to initial data held by the receiving device;

a first difference encoding means for detecting the difference between the image frame to be encoded and the reference image frame, and encoding to compress the difference;

a first encoded data storing means for storing the encoded difference data received from the first difference encoding means;

a first transmitting means for detecting an error detection code in the encoded difference data, and transmitting the encoded difference data together with transmission information including the error detection code to the receiving device;

a first receiving means for receiving reception information from the receiving device, the reception information including information which indicates whether the receiving device finds either OK or NG as a result of error detection check which is based on the error detection code;

a first reproducing means for decoding to reproduce the encoded difference data stored in the first encoded data storing means, then storing it as one reference frame into the first image storing means when the received reception information indicates OK; and a first controlling means for controlling the first difference encoding means to encode to compress the next image frame when the reception information indicates NG, while controlling the first difference encoding means to encode to compress the next image frame only after the first reproducing means stores a new reference frame when the reception information indicates OK, and the receiving device comprises:

a second image storing means including an area where a reproduced image basing upon the encoded difference data is stored;

a second initialization means for initializing the second image storing means by initial data which is identical to initial data held by the transmitting device;

a second receiving means for receiving the encoded difference data from the transmitting device, and detects an error according to an error detection code included in transmission information which was transmitted together with the encoded difference data;

a second encoded data storing means for storing the encoded difference data received by the second receiving means;

a second reproducing means for decoding the encoded difference data in the second encoded data storing means when a result of the error detection is OK, reproducing the image frame by adding the decoded data to content of the second image storing means, and storing the reproduced image frame into the second image storing means;

a second controlling means for generating reception information which includes the result of the error detection by the second receiving means; and a second transmitting means for transmitting the reception information to the transmitting device.

21. The high efficiency transmitting system of claim 20, wherein the first transmitting means divides the encoded difference data into a plurality of radio frames, and transmitting each radio frame and transmission information which includes the error detection code which corresponds to the radio frame to the receiving device;

the first receiving means receives from the receiving device the reception information which corresponds to the transmitted radio frame;

the first controlling means controls the first reproducing means to reproduce the encoded difference data for a single image frame when all the reception information for it indicates OK, while the first controlling means controls the first difference encoding means to encode the difference for a next image frame when at least one of the reception information for a single image frame indicates NG;

the second receiving means receives radio frames into which the encoded difference data is divided; and the second controller controls the second reproducing means to reproduce one image frame of the encoded difference data when the error detection result as for all of the radio frames included in it is OK.

22. The high efficiency transmitting system of claim 21, wherein each radio frame is fixed length, and an excess of encoded data over the data amount of a predetermined number of radio frames is abandoned.

23. The high efficiency transmitting system of claim 22, wherein the first transmission information includes a transmission frame number which indicates the number of image frame which have been transmitted safely;

the first controlling means increments the transmission frame number by one upon each updating of the reference image frame in the first image storing means by the first reproducing means;

the second receiving means receives the transmission information which includes a transmission frame number indicating how many image frames are transmitted safely together with the encoded difference data;

the second controlling means holds a reception frame number indicating how many image frames are received safely and increments the reception frame number by one whenever the second reproducing means updates the reference image frame in the second image storing means; and the second reproducing means decodes the encoded difference data when the result of the error detection is OK as well as the transmission frame number coincides with the reception frame number, whereby the receiving device can check if its own reference image frame is identical to the reference image frame stored in the transmitting device.

24. The high efficiency transmitting system of claim 23, wherein the first initialization means and the second initialization means initialize the first image storing means and the second image storing means respectively when a radio link is established between the transmitting device and the receiving device.

25. The high efficiency transmitting system of claim 20, wherein the transmitting device further comprises:

a first error detection/correction code generating means for generating an error detection/correction code relating to the reference image frame in the first image storing means, wherein the reception information received by the first receiving means includes the error/correction code relating to the reference image frame in the receiving device; and the first controlling means controls the first initialization means to compare the error detection/correction code included in the reception information received by the first receiving means with the error detection/correction code generated by the first error detection/correction code generating means, and controls the first initialization means to initialize the reference image frame stored in the first image storing means when they do not coincide with each other, as well as controls the first transmitting means to transmit the transmission information which directs to initialize the reference image frame stored in the receiving device, and the receiving device further comprises:

a second error detection/correction code generating means for generating an error detection/correction code relating to a reference frame stored in the second image storing means, wherein the second transmission information includes information which directs whether or not the reference frame in the second image storing means should be initialized; and the second controlling means generates reception information which includes the generated error detection/correction code, controls the second transmitting means to transmit the reception information, and controls the second initialization means to initialize the reference image frame in the second image storing means when the information included in the transmission information received by the second receiving means directs the initialization.

26. The high efficiency transmitting system of claim 25, wherein the first transmitting means divides the encoded difference data into a plurality of radio frames, and transmitting each radio frame and the transmission information which includes the error detection code which corresponds to the radio frame to the receiving device;

the first receiving means receives from the receiving device the reception information which corresponds to the transmitted radio frame;

the first controlling means controls the first reproducing means to reproduce the encoded difference data for a single image frame when all the reception information for it indicates OK, while the first controlling means controls the difference encoding means to encode the difference for a next image frame when at least one of the reception information for a single image frame indicates NG;

the first error detection/correction code generating means divides each reference image frame in the first image storing means into a plurality of areas, and generates the error detection/correction code for each area;

the first controlling means operates the comparison as for each area, and, when it does not coincide with that in the receiving device, controls the first transmitting means to transmit the transmission information which directs to initialize the area in the receiving device;

the second receiving means receives radio frames into which the encoded difference data is divided;

the second controlling means controls the second reproducing means to reproduce one image frame of the encoded difference data when the error detection result as for all of the radio frames included in it is OK;

the second error detection/correction code generating means divides each reference image frame in the second image storing means into a plurality of areas, and generates the error detection/correction code for each area; and the second controlling means generates the reception information including the error detection/correction code corresponding to each area, and controls the second transmitting means to transmit the reception information.

27. The high efficiency transmitting system of claim 26, wherein the first transmission information includes a transmission frame number which indicates the number of image frames which have been transmitted safely;

the first controlling means increments the transmission frame number by one upon each updating of the reference image frame in the first image storing means by the first reproducing means, whereby the receiving device can check if its own reference image frame is identical to the reference image frame stored in the transmitting device; and the second receiving means receives the transmission information which includes a transmission frame number indicating how many image frames are transmitted safely together with the encoded difference data;

the second controlling means holds a reception frame number indicating how many image frames are received safely and increments the reception frame number by one whenever the second reproducing means updates the reference image frame in the second image storing means; and the second reproducing means decodes the encoded difference data when the result of the error detection is OK as well as the transmission frame number coincides with the reception frame number.

28. The high efficiency transmitting system of claim 27, wherein the error/correction code is CRC (Cyclic Redundancy Check) code relating to the image data in the area.

29. The high efficiency transmitting system of claim 25, wherein the first error detection/correction code generating means divides the reference image frame in the first image storing means into a plurality of areas, and generates the error detection/correction code relating to each area;

the first transmitting means divides the encoded difference data into a plurality of radio frames, and transmits the transmission information which includes each radio frame, the error detection code corresponding to the radio frame, and the error detection/correction code corresponding to the area to the receiving device;

the first receiving means receives the reception information from the receiving device which includes a check result according to the error detection code, and information which indicates if the area corresponding to the error detection/correction code is identical to one of areas into which the reference image frame in the receiving device is divided;

the first controlling means controls the first transmitting means to transmit the radio frame which was transmitted at the last transmission together with the error detection/correction code for the next area when the check result included in the reception information indicates an error, also controls the first initialization means to initialize all the areas which are not identical to those in the receiving device according to the reception information after the error detection/correction codes for all the areas are transmitted and the reference image frame in the image storing means is updated;

the second error detection/correction code generating means divides the reference image frame in the second image storing means into a plurality of areas, and generates the error detection/correction code relating to each area;

the second receiving means receives the transmission information which includes one of the radio frames into which the encoded difference data is divided, the error detection code corresponding to the radio frame, and the error detection/correction code relating to the corresponding area in the transmitting device;

the second transmitting means transmits the reception information which includes a check result according to the error detection code, and information which indicates if the area corresponding to the error detection/correction code is identical to one of areas into which the reference image frame in the transmitting device is divided; and the second controlling means examines if the area which is received according to the error detection/correction code included in the transmission information is identical to the area, and when the error detection/correction codes for all the areas are transmitted, as well as the reference image frame in the second image storing means is updated, initializes all the areas in the second image storing means which are not identical to those in the transmitting device according to the reception information.

30. A high efficiency transmitting method employed in a system which comprises a transmitting device and a receiving device, for encoding to compress an animated image including a plurality of image frames by detecting a difference between one image frame to be encoded and a reference image frame, then transmitting data of the encoded image to a receiving device by a radio line at high efficiency, wherein the transmitting device comprises:

a first initialization step for, before a first transmission, initializing a first image storing means by initial data which is identical to initial data held by the receiving device;

a first difference encoding step for detecting the difference between the image frame to be encoded and the reference image frame, and encoding to compress the difference, and storing the encoded difference data into a first encoded data storing means;

a first transmitting step for detecting an error detection code in the encoded difference data, and transmitting the encoded difference data together with transmission information including the error detection code to the receiving device;

a first receiving step for receiving reception information from the receiving device, the reception information including information which indicates whether the receiving device finds either OK or NG as a result of error detection check which is based on the error detection code;

a first reproducing step for encoding to reproduce the encoded difference data stored in the first encoded data storing means, then storing it as one reference frame into the first image storing means when the reception information indicates OK; and a first controlling step for controlling the first difference encoding step to encode to compress the next, image frame when the reception information indicates NG, while controlling the first difference encoding step to encode to compress the next image frame only after a new reference frame is stored at the first reproducing step when the reception information indicates OK, and the receiving device comprises:

a second initialization step for initializing a second image storing means which includes an area where a reproduced image basing upon the encoded difference data is stored by initial data which is identical to initial data held by the transmitting device;

a second receiving step for receiving the encoded difference data from the transmitting device and storing it into a second encoded data storing means, as well as detecting an error according to an error detection code included in transmission information which was transmitted together with the encoded difference data;

a second reproducing step for decoding the encoded difference data in the second encoded data storing means when a result of the error detection at the second receiving step is OK, reproducing the image frame by adding the decoded data to content of the second image storing means, and storing the reproduced image frame into the second image storing means;

a second controlling step for generating reception information which includes the result of the error detection at the second reproducing step; and a second transmitting step for transmitting the reception information to the transmitting device.

31. The high efficiency transmitting method of claim 30, wherein at the first transmitting step the encoded difference data is divided into a plurality of radio frames, and each radio frame and transmission information which includes the error detection code which corresponds to the radio frame is transmitted to the receiving device;

at the first receiving step the reception information which corresponds to the transmitted radio frame is received from the receiving device;

at the first controlling step, when all the reception information for a single image frame is OK, it is controlled to return to the first reproducing step for reproducing the encoded difference data, while when at lest one of the reception information for a single frame indicates NG, it is controlled to return to the difference encoding step for encoding the difference for a next image frame;

at the second receiving step radio frames into which the encoded difference data is divided are received; and at the second controlling step, when the error detection result for all of the radio frames included in one image frame of the encoded and compressed difference data is OK, it is controlled to return to the second reproducing step for reproducing one image frame of the encoded difference data.

32. The high efficiency transmitting method of claim 31, wherein each radio frame is fixed length, and an excess of encoded data over the data amount of a predetermined number of radio frames is abandoned.

33. The high efficiency transmitting method of claim 32, wherein the first transmission information includes a transmission frame number which indicates the number of image frames which have been transmitted safely;

the first controlling step controls to increment the transmission frame number by one upon each updating of the reference image frame in the first image storing means at the first reproducing step;

at the second receiving step the transmission information which includes a transmission frame number indicating how many image frame are transmitted safely is received together with the encoded difference data;

at the second controlling step a reception frame number indicating how many image frames are received safely is held and the reception frame number is incremented by one whenever the reference image frame in the second image storing means is updated at the second reproducing step; and at the second reproducing means the encoded difference data is decoded when the result of the error detection is OK as well as the transmission frame number coincides with the reception frame number, whereby the receiving device can check if its own reference image frame is identical to the reference image frame stored in the transmitting device.

34. The high efficiency transmitting method of claim 33, wherein at the first initialization step and the second initialization step the first image storing means and the second image storing means are initialized respectively when a radio link is established between the transmitting device and the receiving device.

35. The high efficiency transmitting method of claim 30, wherein the transmitting device comprising a first error detection/correction code generating step between the first reproducing step and the first controlling step, the first error detection/correction code generating step for generating an error detection/correction code relating to the reference image frame in the first image storing means;

the reception information received at the first receiving step includes the error/correction code relating to the reference image frame stored in the receiving device;

at the first controlling step it is controlled to compare the error detection/correction code included in the reception information with the error detection/correction code generated at the error detection/correction code generating step, and controlled to initialize the reference image frame stored in the first image storing means when they do not coincide with each other at the first initialization step, as well as controlled to transmit the transmission information which directs to initialize the reference image frame stored in the receiving device at the first transmitting step;

the receiving device further comprises a second error detection/correction code generating step between the second reproducing step and the second controlling step, the second error detection/correction code generating step for generating an error detection/correction code relating to a reference frame stored in the second image storing means;

the second transmission information includes information which directs whether or not the reference frame in the second image storing means should be initialized; and at the second controlling steps it is controlled to generate reception information which includes the generated error detection/correction code, and transmit the reception information at the second transmitting step, and initialize the reference image frame in the second image storing means when the information included in the transmission information received at the second receiving step directs the initialization.

36. The high efficiency transmitting method of claim 35, wherein at the first transmitting step the encoded difference data is divided into a plurality of radio frames, and each radio frame and transmission information which includes the error detection code which corresponds to the radio frame is transmitted to the receiving device;

at the first receiving step the reception information which corresponds to the transmitted radio frame is received from the receiving device;

at the first controlling step, the first reproducing step is controlled to reproduce encoded difference data for a single image frame when all the reception information for it indicates OK, while the difference encoding step is controlled to encode the difference for a next image frame when at least one of the reception information for a single image frame indicates NG;

at the first error detection/correction code generating step each reference image frame in the first image storing means is divided into a plurality of areas, and the error detection/correction code for each area is generated;

at the first controlling step the comparison is operated as for each area, and, when it does not coincide with that in the receiving device, the first transmitting step is controlled to transmit the transmission information which directs to initialize the area in the receiving device;

at the second receiving step radio frames into which the encoded difference data is divided are received;

at the second controlling step the second reproducing step is controlled to reproduce one image frame of the encoded difference data when the error detection result as for all of the radio frames included in it is OK;

at the second error detection/correction code generating step each reference image frame in the second image storing means is divided into a plurality of areas, and the error detection/correction code is generated for each area; and at the second controlling step the reception information including the error detection/correction code corresponding to each area is generated, and the second transmitting step is controlled to transmit the reception information.

37. The high efficiency transmitting method of claim 36, wherein the first transmission information includes a transmission frame number which indicates the number of image frames which have been transmitted safely;

at the first controlling step the transmission frame number is incremented whenever the reference image frame in the first image storing means is updated at the first reproducing step, whereby the receiving device can check if its own reference image frame is identical to the reference image frame in the transmitting device; and at the second receiving step the transmission information which includes a transmission frame number indicating how many image frames are transmitted safely is received together with the encoded difference data;

at the second controlling step a reception frame number indicating how many image frames are received safely is held and the reception frame number is incremented by one whenever the reference image frame in the second image storing means is updated at the second reproducing step; and at the second reproducing step the encoded difference data is decoded when the result of the error detection is OK as well as the transmission frame number coincides with the reception frame number.

38. The high efficiency transmitting method of claim 37, wherein the error/correction code is CRC (Cyclic Redundancy Check) code relating to the image data in the area.

39. The high efficiency transmitting method of claim 35, wherein at the first error detection/correction code generating step the reference image frame in the first image storing means is divided into a plurality of areas, and the error detection/correction code relating to each area is generated;

at the first transmitting step the encoded difference data is divided into a plurality of radio frames, and the transmission information which includes each radio frame, the error detection code corresponding to the radio frame, and the error detection/correction code corresponding to the area is transmitted to the receiving device;

at the first receiving step the reception information is received from the receiving device which includes a check result according to the error detection code, and information which indicates if the area corresponding to the error detection/correction code is identical to one of areas into which the reference image frame in the receiving device is divided;

at the first controlling step the first transmitting step is controlled to transmit the radio frame which was transmitted at the last transmission together with the error detection/correction code for the next area when the check result included in the reception information indicates an error, also the first initialization step is controlled to initialize all the areas which are not identical to those in the receiving device according to the reception information after the error detection/correction codes for all the areas are transmitted and the reference image frame in the image storing means is updated;

at the second error detection/correction code generating step the reference image frame in the second image storing means is divided into a plurality of areas, and the error detection/correction code relating to each area is generated;

at the second receiving step the transmission information which includes one of the radio frames into which the encoded difference data is divided, the error detection code corresponding to the radio frame, and the error detection/correction code relating to the corresponding area in the transmitting device is received;

at the second transmitting step the reception information which includes a check result according to the error detection code, and information which indicates if the area corresponding to the error detection/correction code is identical to one of areas into which the reference image frame in the receiving device is divided is transmitted; and at the second controlling step it is examined if the area which is received according to the error detection/correction code included in the transmission information is identical to the area, and when the error detection/correction codes for all the areas are transmitted, as well as the reference image frame in the second image storing means is updated, all the areas in the second image storing means which are not identical to those in the transmitting device according to the reception information are initialized.

* * * * *

UNITED STATES PATENT AND TRADEMARK OFFICE
CERTIFICATE OF CORRECTION

PATENT NO : 5,550,756

DATED : August 27, 1996

INVENTOR(S): Shinichiro Ohmi et al.

It is certified that error appears in the above-identified patent and that said Letters Patent is hereby corrected as shown below:

Delete Fig. 15 of the patent and replace Fig. 15 with the attached Fig. 15.

Col. 13, line 40, delete "Fig. 11" and insert --Fig. 10--.

Signed and Sealed this

Third Day of November, 1998

Attest:

*Attesting Officer*

BRUCE LEHMAN

*Commissioner of Patents and Trademarks*